(12) United States Patent
Asai et al.

(10) Patent No.: US 11,237,538 B2
(45) Date of Patent: Feb. 1, 2022

(54) SUBSTRATE PROCESSING APPARATUS, DEVICE MANAGEMENT CONTROLLER, AND RECORDING MEDIUM

(71) Applicant: KOKUSAI ELECTRIC CORPORATION, Tokyo (JP)

(72) Inventors: Kazuhide Asai, Toyama (JP); Kazuyoshi Yamamoto, Toyama (JP); Hidemoto Hayashihara, Toyama (JP); Takayuki Kawagishi, Toyama (JP); Kayoko Yashiki, Toyama (JP); Yukio Miyata, Toyama (JP); Hiroyuki Iwakura, Toyama (JP); Masanori Okuno, Toyama (JP); Kenichi Fujimoto, Toyama (JP); Ryuichi Kaji, Toyama (JP)

(73) Assignee: KOKUSAI ELECTRIC CORPORATION, Tokyo (JP)

( * ) Notice: Subject to any disclaimer, the term of this patent is extended or adjusted under 35 U.S.C. 154(b) by 544 days.

(21) Appl. No.: 15/468,906

(22) Filed: Mar. 24, 2017

(65) Prior Publication Data
US 2017/0285613 A1 Oct. 5, 2017

(30) Foreign Application Priority Data

Mar. 29, 2016 (JP) .............................. JP2016-065604
Feb. 24, 2017 (JP) .............................. JP2017-033215

(51) Int. Cl.
*G05B 19/406* (2006.01)
*G05B 19/418* (2006.01)

(52) U.S. Cl.
CPC ....... *G05B 19/406* (2013.01); *G05B 19/4184* (2013.01); *G05B 2219/2602* (2013.01); *G05B 2219/45031* (2013.01)

(58) Field of Classification Search
CPC .............. G05B 19/406; G05B 19/4184; G05B 2219/2602; G05B 2219/45031
(Continued)

(56) References Cited

U.S. PATENT DOCUMENTS

| 6,728,262 B1 | 4/2004 | Woram |
| 7,477,960 B2 | 1/2009 | Willis et al. |

(Continued)

FOREIGN PATENT DOCUMENTS

| CN | 105247657 A | 1/2016 |
| JP | 3300816 B2 | 7/2002 |

(Continued)

OTHER PUBLICATIONS

Korean Office Action dated Apr. 11, 2019 for the Korean Patent Application No. 10-2019-0035752.
(Continued)

*Primary Examiner* — Michael P Nghiem
*Assistant Examiner* — Dacthang P Ngo
(74) *Attorney, Agent, or Firm* — Volpe Koenig

(57) ABSTRACT

A substrate processing apparatus includes a device management controller including a parts management control part configured to monitor the state of parts constituting the apparatus, a device state monitoring control part configured to monitor integrity of device data obtained from an operation state of the parts constituting the apparatus, and a data matching control part configured to monitor facility data provided from a factory facility to the apparatus. The device management controller is configured to derive information evaluating the operation state of the apparatus based on a plurality of monitoring result data selected from a group consisting of maintenance timing monitoring result data acquired by the parts management control part, device state monitoring result data acquired by the device state moni-
(Continued)

toring control part, and utility monitoring result data acquired by the data matching control part.

21 Claims, 18 Drawing Sheets

(58) Field of Classification Search
USPC .......................................................... 702/182
See application file for complete search history.

(56) References Cited

U.S. PATENT DOCUMENTS

| | | | |
|---|---|---|---|
| 7,751,921 B2 | 7/2010 | Sakamoto et al. | |
| 7,930,049 B2 | 4/2011 | Joho | |
| 9,400,794 B2 | 7/2016 | Asai et al. | |
| 9,412,256 B2 | 8/2016 | Namioka | |
| 2007/0010906 A1 | 1/2007 | Abe | |
| 2008/0192023 A1* | 8/2008 | Yamamoto | G06F 9/451 345/173 |
| 2009/0118855 A1* | 5/2009 | Joho | G05B 19/4183 700/108 |
| 2011/0079177 A1 | 4/2011 | Asai et al. | |
| 2012/0226475 A1 | 9/2012 | Asai | |
| 2012/0253724 A1* | 10/2012 | Asai | G05B 23/0235 702/88 |
| 2013/0238113 A1 | 9/2013 | Kawasaki et al. | |
| 2015/0039116 A1* | 2/2015 | Yamamoto | H01L 21/67288 700/108 |
| 2016/0078163 A1* | 3/2016 | Koshimaki | G06F 17/5045 716/139 |

FOREIGN PATENT DOCUMENTS

| | | |
|---|---|---|
| JP | 2009-016379 A | 1/2009 |
| JP | 2012-216697 A | 11/2012 |
| JP | 5107056 B2 | 12/2012 |
| JP | 5546197 B2 | 7/2014 |
| JP | 5855841 B2 | 2/2016 |
| KR | 100933001 B1 | 12/2009 |
| KR | 10-2011-0043571 A | 4/2011 |
| TW | 201246116 A | 11/2012 |
| TW | 201351530 A | 12/2013 |
| WO | 2007/122902 A1 | 11/2007 |
| WO | 2014/189045 A1 | 2/2017 |

OTHER PUBLICATIONS

Korean Office Action dated May 29, 2018 for the Korean Patent Application No. 10-2017-0037616.
The Taiwanese Office Action dated Dec. 19, 2017 for the Taiwanese Application No. 106107238.
Chinese Office Action dated Nov. 12, 2019 for the Chinese Patent Application No. 201710128701.7.
Korean Office Action dated Aug. 27, 2019 for the Korean Patent Application No. 10-2019-0098111.
Korean Office Action dated Feb. 14, 2020 for the Korean Patent Application No. 10-2020-0008384.
U.S. Office Action dated Mar. 29, 2021 for U.S. Appl. No. 16/800,719.
Japanese Office Action dated May 6, 2021 for Japanese Patent Application No. 2019-171274.

* cited by examiner

FIG. 8

Health Summary

Halth index 95 point

☐ The day
▨ Average over one week
▨ Average over one month

Detail Information

Update: 2015/11/11 17:00

| Class. | Module | U.FDC | S.FDC | Parts | Alarm | Score |
|---|---|---|---|---|---|---|
| Reaction chamber | Temperature | ○ | × | △ | ○ | 60 |
| | Pressure | ○ | — | ○ | ○ | 100 |
| | Gas | ○ | — | ○ | ○ | 100 |
| | Exhaust pressure | △ | — | ○ | ○ | 85 |
| | Water | ○ | — | ○ | ○ | 100 |
| Transfer chamber | O₂ concentration | ○ | ○ | — | ○ | 100 |
| | Pressure | — | ○ | — | — | 100 |
| | Temperature | — | ○ | — | — | 100 |
| Loader chamber | N₂ supply amount | — | — | — | — | 100 |
| | Exhaust pressure | — | — | — | — | 100 |
| Transfer system | Opener | — | — | — | — | 100 |
| Customer utility | GAS | △ | — | △ | △ | 85 |
| | Pressure | — | — | — | ○ | 100 |
| | Exhaust pressure | — | — | — | ○ | 100 |
| | PUMP | — | — | — | ○ | 85 |
| | Water | — | — | — | ○ | 100 |

Health Check View

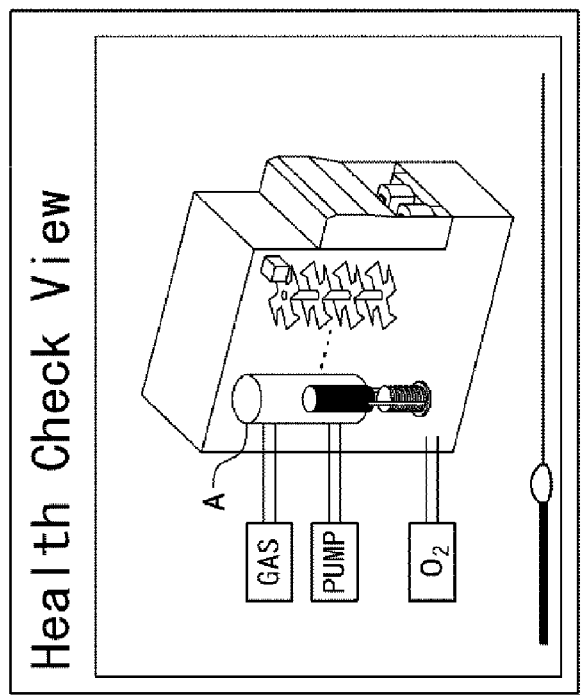

Supply Check

Update: 2015/11/11 17:00

| Precursor | AA |
| Cooling Water Flow | B |
| LTP Purge & Blower | A |
| Exhaust | |
| Pump | |
| FAN | |

FIG. 9

| No. | Diagnosis item | Diagnosis method | Deduction △ | Deduction × |
|---|---|---|---|---|
| 1 | U.FDC | Diagnose sudden change in main device data using SPC rule 1 | −15 | −30 |
| 2 | S.FDC | Diagnose abnormality of apparatus under independent conditions of apparatus maker | −15 | −30 |
| 3 | Parts | Diagnose whether or not number of uses or time of use of parts exceeds maker recommended value | −10 | −20 |
| 4 | Alarm | Diagnose state of apparatus from number of occurrence of Alarm for target portion | −5 | −10 |

FIG. 11

| COPY | | | | |
|---|---|---|---|---|
| File | Total matching ratio : 85% | Matching ratio | Match number/ total number | Date of operation completion |
| ☐ Recipe 1 | | | 160/200 | 2015/11/28 |
| ☐ Recipe 2 | | | 10/12 | 2015/11/28 |
| ☐ Recipe 3 | | | 12/12 | 2015/11/28 |
| ☐ Recipe 4 | | | 12/12 | 2015/11/28 |
| ☐ Recipe 5 | | | 10/12 | 2015/11/28 |
| ☐ Recipe 6 | | | 10/12 | 2015/12/9 |
| ☐ Recipe 7 | | | 5/12 | 2015/12/9 |
| ☐ Recipe 8 | | | 12/12 | 2015/12/9 |
| ☐ Recipe 9 | | | 12/12 | 2015/12/9 |
| ☐ Recipe 10 | | | 163/200 | 2015/12/9 |

| COMPARE | | | | |
|---|---|---|---|---|
| Parameter | Total matching ratio : 92% | Matching ratio | Match number/ total number | Date of operation completion |
| OU | ☐ Parameter 1 | | 231/244 | 2015/12/9 |
| | ☐ Parameter 2 | | 34/34 | 2015/11/28 |
| | ☐ Parameter 3 | | 101/129 | 2015/11/28 |
| | ☐ Parameter 4 | | 201/201 | 2015/12/1 |
| | ☐ Parameter 5 | | 20/20 | 2015/12/9 |
| RoBo | ☐ Parameter 6 | | 34/34 | 2015/12/9 |
| | ☐ Parameter 7 | | 702/702 | 2015/12/9 |
| | ☐ Parameter 8 | | 34/34 | 2015/12/9 |
| | ☐ Parameter 9 | | 2310/2500 | 2015/11/28 |
| | ☐ Parameter 10 | | 190/200 | 2015/12/9 |
| | ☐ Parameter 11 | | 120/128 | 2015/12/9 |

| No. | ID | Description | Value 1 | Value 2 |
|---|---|---|---|---|
| 18 | ........ | ........ | 2 | 5 |
| 62 | ........ | ........ | 2 | 10 |
| 63 | ........ | ........ | 2 | 10 |

SUBSTRATE PROCESSING APPARATUS, DEVICE MANAGEMENT CONTROLLER, AND RECORDING MEDIUM

CROSS-REFERENCE TO RELATED APPLICATIONS

This application is based upon and claims the benefit of priority from Japanese Patent Application Nos. 2016-065604 and 2017-033215, filed on Mar. 29, 2016 and Feb. 24, 2017, the entire contents of which are incorporated herein by reference.

TECHNICAL FIELD

The present disclosure relates to a technique for grasping the operation state of a substrate processing apparatus for processing a substrate, for example, a semiconductor manufacturing apparatus for forming a film on a substrate, and relates to a substrate processing apparatus, a device management controller, and a recording medium.

BACKGROUND

In the field of semiconductor manufacture, in order to improve the operation rate and production efficiency of a substrate processing apparatus, device makers (semiconductor device makers) autonomously manage information of the apparatus. As a basic monitoring means, a means for collecting information of a semiconductor manufacturing apparatus by means of a server and detecting abnormality of the apparatus by statistical analysis technology or the like is being generally used.

For example, there have been proposed a technique for managing the integrity of data, a technique for analyzing an abnormality which occurs in data, and a technique for maintaining and managing parts constituting a substrate processing apparatus. These techniques allow a management device connected to the substrate processing apparatus to manage the operation state of the substrate processing apparatus.

However, as device miniaturization progresses, the amount of data of an apparatus tends to increase and production management that self-monitors on the apparatus side has been demanded without increasing the load of a device manufacturer. Further, in the era of enhanced IoT (Internet of Things), a technology for data processing has been required on an apparatus side. Therefore, there is a need for countermeasures for more stable operation of an apparatus.

SUMMARY

The present disclosure provides some embodiments of a technique capable of providing information indicating whether or not a substrate processing apparatus can be operated stably.

According to the present disclosure, there is provided a substrate processing apparatus including: a device management controller including at least a parts management control part configured to monitor the state of parts constituting the apparatus, a device state monitoring control part configured to monitor integrity of device data obtained from an operation state of the parts constituting the apparatus, and a data matching control part configured to monitor facility data provided from a factory facility to the apparatus, wherein information evaluating the operation state of the apparatus is derived based on a plurality of monitoring result data selected from a group consisting of maintenance timing monitoring result data acquired by the parts management control part, device state monitoring result data acquired by the device state monitoring control part, and utility monitoring result data acquired by the data matching control part.

BRIEF DESCRIPTION OF THE DRAWINGS

FIG. 8 is a view showing a display example of an integration screen of an operation state of the apparatus according to one embodiment of the present disclosure.

FIG. 9 is a view showing one example of a diagnosis method item list of the operation state of the apparatus according to one embodiment of the present disclosure.

FIG. 11 is a view for explaining a file matching display screen according to one embodiment of the present disclosure.

DETAILED DESCRIPTION (Overview of Substrate Processing Apparatus)

Figure 1:
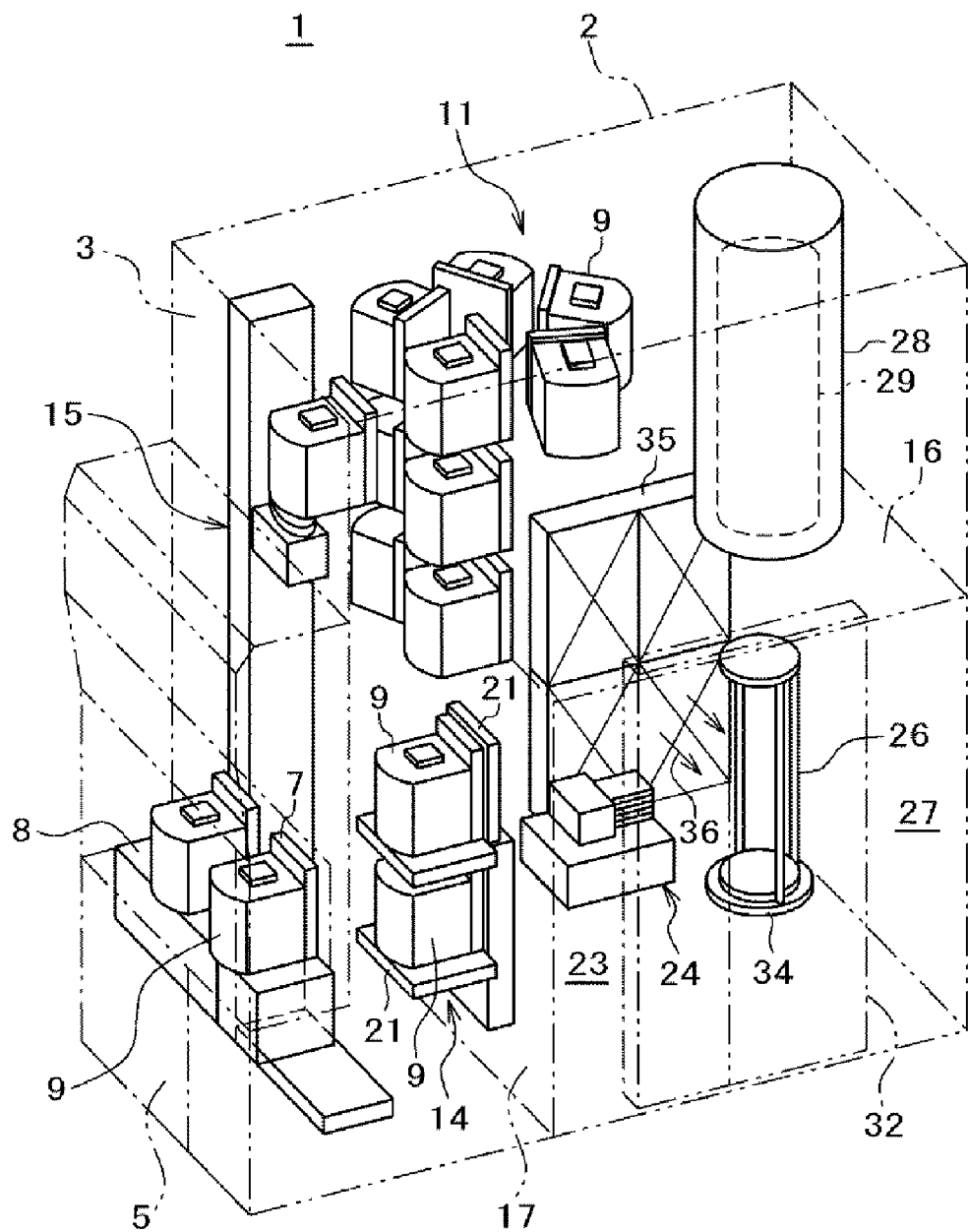
FIG. 1 is a perspective view of a substrate processing apparatus suitably used in one embodiment of the present disclosure.
Figure 2:
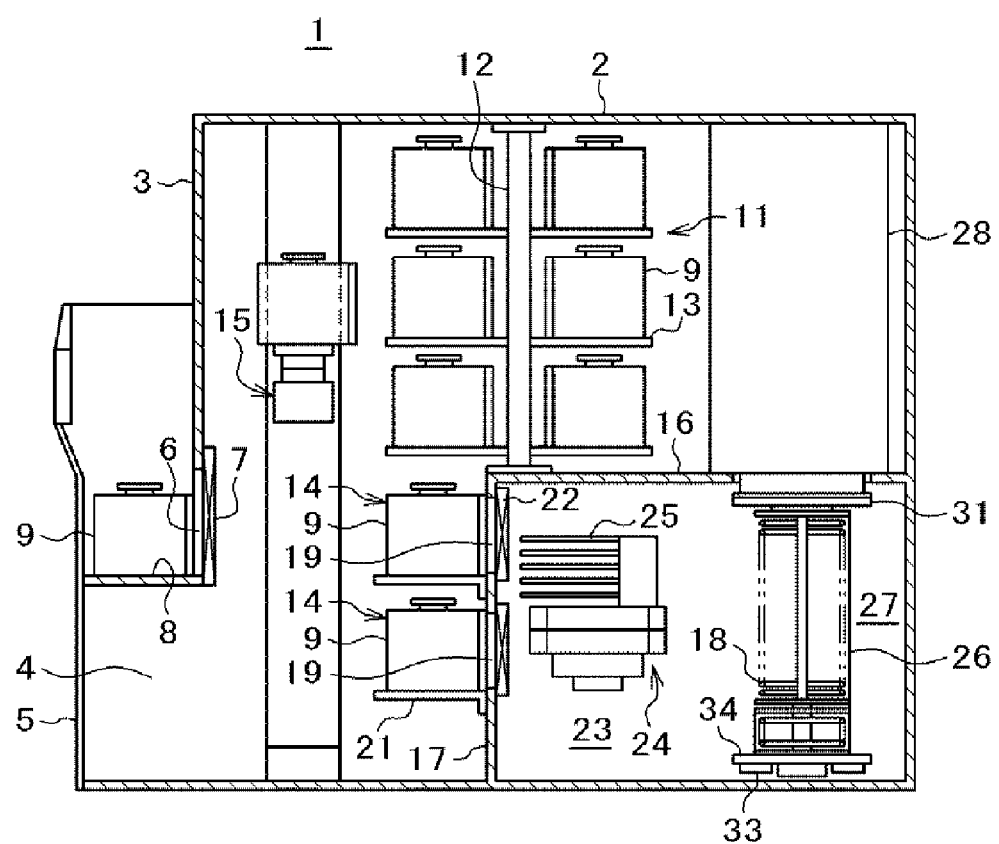
FIG. 2 is a side sectional view of the substrate processing apparatus suitably used in one embodiment of the present disclosure.

One embodiment of the present disclosure will now be described with reference to the drawings. First, a substrate processing apparatus 1 (hereinafter simply referred to as an "apparatus") in which the present disclosure is implemented will be described with reference to FIGS. 1 and 2.

The substrate processing apparatus 1 includes a housing 2. A front opening 4 provided for maintenance is formed in a lower portion of a front wall 3 of the housing 2 and is opened/closed by a front door 5.

A pod loading/unloading port 6 is formed in the front wall 3 of the housing 2 so as to provide a passage between the inside of the housing 2 and the outside of the housing 2. The pod loading/unloading port 6 is opened/closed by a front shutter 7. A load port 8 is formed in the front side of the pod loading/unloading port 6. The load port 8 is configured so as to align with a mounted pod 9.

The pod 9 is a hermetically sealed substrate transfer container and is loaded/unloaded onto/from the load port 8 by means of an in-process transfer device (not shown).

A rotary pod shelf 11 is installed at the upper part of the housing 2 in substantially a central portion in a front-rear direction. The rotary pod shelf 11 is configured to store a plurality of pods 9.

The rotary pod shelf 11 includes a support pillar 12 vertically erected and intermittently rotated, and a plurality of shelf plates 13 forming multiple stages radially supported on the support pillar 12 at respective positions of upper, middle and lower stages. The shelf plates 13 are configured to store a plurality of pods 9 mounted thereon.

A pod opener 14 is installed below the rotary pod shelf 11. The pod opener 14 is configured to mount a pod 9 and open/close a lid of the pod 9.

A pod transfer mechanism 15 is installed between the load port 8, the rotary pod shelves 11 and the pod opener 14. The pod transfer mechanism 15 is capable of holding the pod 9, raising/lowering in a vertical direction and advancing/retracting in a horizontal direction. The pod transfer mechanism 15 is configured to transfer the pod 9 between the load port 8, the rotary pod shelves 11 and the pod opener 14.

A sub housing 16 is installed across the rear end of the housing 2 at the lower part in substantially a central portion in the front-rear direction. A pair of wafer loading/unloading ports (substrate loading/unloading ports) 19 for loading/unloading a wafer (hereinafter also referred to as a substrate) 18 into/from the sub housing 16 is arranged in two upper and lower stages in a front wall 17 of the sub housing 16. The pod opener 14 is provided for each of the substrate loading/unloading ports 19.

The pod opener 14 includes a mounting table 21 on which the pod 9 is mounted and an opening/closing mechanism 22 for opening/closing the lid of the pod 9. The pod opener 14 is configured to open/close a wafer gateway of the pod 9 by opening/closing the lid of the pod 9 mounted on the mounting table 21 by means of the opening/closing mechanism 22.

The sub housing 16 forms a transfer chamber 23 airtightly sealed from a space (pod transfer space) in which the pod transfer mechanism 15 and the rotary pod shelves 11 are disposed. A wafer transfer mechanism (substrate transfer mechanism) 24 is installed in the front region of the transfer chamber 23. The substrate transfer mechanism 24 includes a required number (five in the figure) of wafer mounting plates 25 on which substrates 18 are mounted. The wafer mounting plates 25 are capable of being linearly moved in the horizontal direction, being rotated in the horizontal direction, and being moved in the vertical direction. The substrate transfer mechanism 24 is configured to charge/discharge the substrate 18 into/from a boat (hereinafter also referred to as a substrate holder) 26.

A standby part 27 for accommodating and keeping the boat 26 in a standby state is formed in the rear region of the transfer chamber 23 and a vertical processing furnace 28 is installed above the standby part 27. A process chamber 29 is formed in the processing furnace 28. A lower end portion of the process chamber 29 is a furnace opening opened/closed by a furnace opening shutter 31.

A boat elevator 32 for moving the boat 26 up/down is installed between the right end portion of the housing 2 and the right end portion of the standby part 27 of the sub housing 16. A seal cap 34 as a lid is horizontally attached to an arm 33 connected to an elevation base of the boat elevator 32. The lid 34 vertically supports the boat 26 and air-tightly closes the furnace opening in a state in which the boat 26 is charged in the process chamber 29.

The boat 26 is configured hold a plurality of wafers 18 (for example, about 50 to 125 wafers) in a horizontal posture in multiple stages with their centers aligned.

A clean unit 35 is disposed at a position opposite the boat elevator 32 side. The clean unit 35 is constituted by a supply fan and a dustproof filter so as to supply clean air 36 which is a cleaned atmosphere or an inert gas.

The clean air 36 blown out from the clean unit 35 flows through the wafer transfer mechanism 24 and the boat 26 and is then sucked by a duct (not shown) and exhausted to the outside of the housing 2 or is blown into the transfer chamber 23 by the clean unit 35.

Next, the operation of the apparatus 1 will be described.

When the pod 9 is supplied to the load port 8, the pod loading/unloading port 6 is opened by the front shutter 7. The pod 9 on the load port 8 is loaded by the pod transfer device 15 into the housing 2 through the pod loading/unloading port 6 and mounted on a specified shelf plate 13 of the rotary pod shelf 11. The pod 9 is temporarily stored in the rotary pod shelf 11 and is then transferred from the shelf plate 13 to one pod opener 14 by the pod transfer device 15 or directly transferred from the load port 8 to the mounting table 21.

At this time, the wafer loading/unloading port 19 is closed by the opening/closing mechanism 22 and the clean air 36 is circulated and filled in the transfer chamber 23. For example, the transfer chamber 23 is filled with a nitrogen gas as the clean air 36 and has an oxygen concentration of 20 ppm or less, which is much lower than oxygen concentration in the pod transfer space in the inside (air atmosphere) of the housing 2.

The opening side end surface of the pod 9 mounted on the mounting table 21 is pressed against the opening edge portion of the wafer loading/unloading port 19 in the front wall 17 of the sub housing 16 and at the same time, the lid is removed by the opening/closing mechanism 22 to open the wafer gateway.

When the pod 9 is opened by the pod opener 14, the substrate 18 is taken out from the pod 9 by the substrate transfer mechanism 24 and is transferred to a notch alignment device (not shown) by which the substrate 18 is aligned. After that, the substrate transfer mechanism 24 transfers the substrate 18 into the standby part 27 behind the transfer chamber 23 and charges it in the boat 26.

After delivering the substrate 18 to the boat 26, the substrate transfer mechanism 24 returns to the pod 9 and charges the next substrate 18 in the boat 26.

While charging the substrate 18 in the boat 26 by the substrate transfer mechanism 24 in one (upper or lower) pod opener 14, another pod 9 is transferred from the rotary pod shelf 11 to the pod opener 14 in the other (lower or upper) pod opener 14 by the pod transfer device 15 so as to perform the work of opening the pod 9 by the other pod opener 14 simultaneously.

When the prescribed number of substrates 18 is charged in the boat 26, the furnace opening of the processing furnace 28 which has been closed by the furnace opening shutter 31 is opened by the furnace opening shutter 31. Subsequently, the boat 26 is moved up by the boat elevator 32 and is loaded into the process chamber 29.

After loading, the furnace opening is air-tightly closed by the seal cap 34. In this embodiment, at this timing (after loading), a purge process (pre-purging process) is performed in which the atmosphere of the process chamber 29 is replaced with an inert gas.

The process chamber 29 is vacuum-exhausted by a gas exhaust mechanism (not shown) so that the process chamber 29 has a desired pressure (degree of vacuum). In addition, the process chamber 29 is heated to a predetermined temperature by a heater driving unit (not shown) so as to obtain a desired temperature distribution. In addition, a processing gas controlled to a predetermined flow rate is supplied into the process chamber 29 by a gas supply mechanism (not shown).

The processing gas supplied into the process chamber 29 is brought into contact with the surface of the substrate 18 and a predetermined process is performed on the surface of the substrate 18. Further, the processing gas remaining after reaction is exhausted from the process chamber 29 by the gas exhaust mechanism.

With the lapse of a preset processing time, an inert gas is supplied from an inert gas supply source (not shown) by the gas supply mechanism, the atmosphere of the process chamber 29 is replaced with the inert gas, and the pressure of the process chamber 29 is returned to the normal pressure (after-purging step). Then, the boat 26 and the lid 34 are moved down by the boat elevator 32.

As for unloading the processed substrate 18, the substrate 18 and the pod 9 are discharged out of the housing 2 in a procedure reverse to that described above. An unprocessed substrate 18 is further charged in the boat 26 and then a batch process of the substrate 18 is repeated.

(Functional Configuration of Control System 200)

Figure 3:
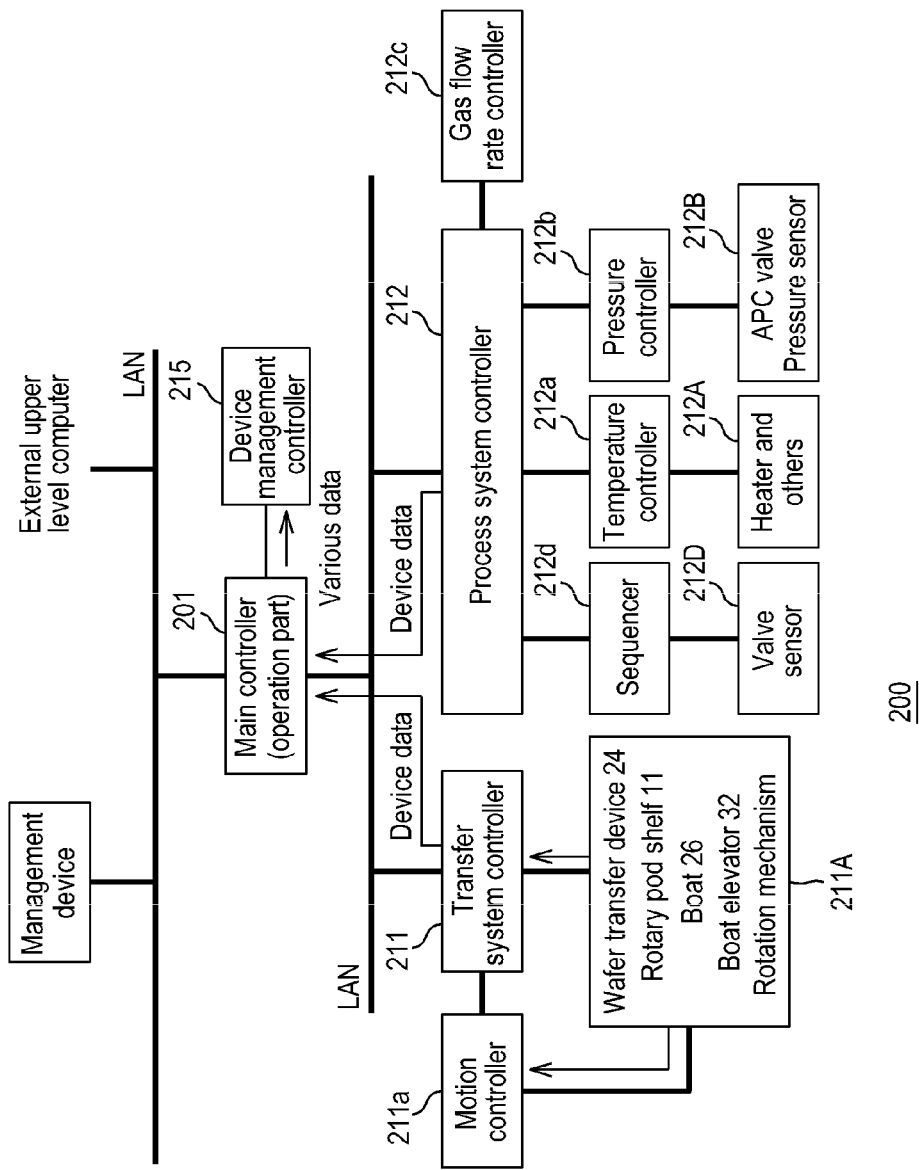
FIG. 3 is a view showing a functional configuration of a control system suitably used in one embodiment of the present disclosure.

Next, a functional configuration of a control system 200 having, as a main component, a main controller 201 as an operation part will be described with reference to FIG. 3. As shown in FIG. 3, the control system 200 includes an operation part 201, a transfer system controller 211 as a transfer control part, a process system controller 212 as a process control part, and a device management controller 215 as a data monitoring part. In the present embodiment, the control system 200 is accommodated in the apparatus 1.

Since the operation part 201 is electrically connected to the transfer control part 211 and the process control part 212 via a LAN line such as 100BASE-T, the operation part 201 is configured to be able to transmit and receive device data, download and upload files, etc.

The device data used herein refers to data generated when the apparatus 1 is in an operating state, for example, data generated when the apparatus 1 operates each component when processing the substrate 18. The device data may include, for example, data (monitor data) related to substrate processing, such as a process temperature, a process pressure and a flow rate of a process gas at the time when the apparatus 1 processes the substrate 18, data (process data) related to the quality of a manufactured product substrate, such as a thickness of a formed film and a cumulative value of the film thickness, and data (parts data) related to constituent parts of the apparatus 1, such as a quartz reaction tube, a heater, a valve and an MFC, and the like.

In the present embodiment, the device data also includes data (facility data) provided from a customer factory to the apparatus 1, such as power, water, a gas flow rate and an exhaust device. The device data further includes data related to alarm monitoring (alarm occurrence information data) which is being executed by a process recipe, maintenance information (event data) generated while a process recipe is not being executed, and failure information data such as data related to abnormality analysis (abnormality analysis data).

The operation part 201 is provided with a port as a mounting part in/from which a recording medium (for example, a USB memory or the like) as an external storage device is inserted/removed. An operating system (OS) corresponding to this port is installed in the operation part 201. Further, an external upper level computer and a management device are connected to the operation part 201 via, for example, a communication network. Therefore, even when the apparatus 1 is installed in a clean room, the upper level computer can be placed in an office or the like outside the clean room. The management device is connected to the apparatus 1 via a LAN line and has a function of collecting device data from the operation part 201.

The device management controller 215 is connected to the operation part 201 via the LAN line, collects the device data from the operation part 201, and derives an index indicating the operation state of the apparatus based on data created by processing the device data. The device management controller 215 will be described later in detail.

The transfer control part 211 is connected to and controls a substrate transfer system 211A mainly constituted by the rotary pod shelf 11, the boat elevator 32, the pod transfer device 15, the substrate transfer mechanism 24, the boat 26 and a rotation mechanism (not shown). In particular, the transfer control part 211 is configured to control the transfer operation of the boat elevator 32, the pod transfer device 15 and the substrate transfer mechanism 24 via a motion controller 211a.

The process control part 212 includes a temperature controller 212a, a pressure controller 212b, a gas flow rate controller 212c and a sequencer 212d. The temperature controller 212a, the pressure controller 212b, the gas flow rate controller 212c and the sequencer 212d constitute a sub-controller and are electrically connected to the process control part 212, so that they can do transmission and reception of device data, download and upload of files, etc. Although the process control part 212 and the sub-controller are illustrated separately, they may be integrated.

A heating mechanism 212A constituted by a heater, a temperature sensor and the like is connected to the temperature controller 212a. The temperature controller 212a is configured to control the internal temperature of the processing furnace 28 by controlling the heater temperature of the processing furnace 28. The temperature controller 212a is configured to control power supplied to a heater wire while controlling a thyristor.

A gas exhaust mechanism 212B constituted by a pressure sensor, an APC valve as a pressure valve, and a vacuum pump is connected to the pressure controller 212b. Based on a pressure value detected by the pressure sensor, the pressure controller 212b is configured to control the opening degree of the APC valve and the operation of the vacuum pump so that the process chamber 29 has a desired pressure at a desired timing.

The gas flow rate controller 212c is constituted by an MFC (Mass Flow Controller). The sequencer 212d is configured to control supply and stop of a gas from a processing gas supply pipe or a purge gas supply pipe by opening/closing a valve 212D. Further, the process control part 212 is configured to control the MFC 212c and the sequencer 212d so that a gas supplied into the process chamber 29 has a desired flow rate at a desired timing.

The operation part 201, the transfer control part 211, the process control part 212 and the device management controller 215 according to the present embodiment can be realized by using a typical computer system, instead of a dedicated system. For example, each control part/controller that executes a predetermined process can be configured by installing a program for executing the above-described processes in a general-purpose computer from a recording medium (USB memory or the like) in which the program is stored.

A means for supplying this program is optional. Besides being able to supply this program via a predetermined recording medium as described above, this program may be supplied via, for example, a communication line, a communication network, a communication system or the like. In this case, for example, the program may be posted on a bulletin board of the communication network and may be provided in a way that it is superimposed on a carrier wave via a network. A predetermined process can be executed by starting the program thus provided and executing it in the same manner as other application programs under control of the OS.

(Configuration of Main Controller (Operation Part) 201)

Figure 4:
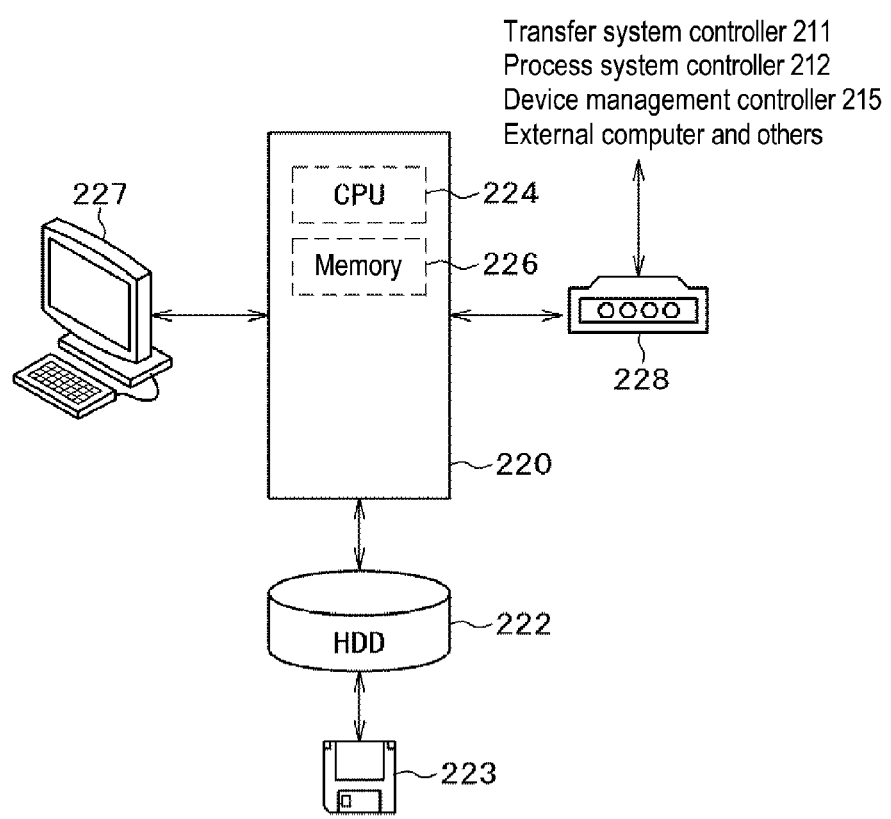
FIG. 4 is a view showing a functional configuration of a main controller suitably used in one embodiment of the present disclosure.

Next, the configuration of the operation part 201 will be described with reference to FIG. 4.

The operation part 201 includes a main control part 220, a hard disk 222 as a main control storage part, an operation display part 227 including a display part for displaying various kinds of information and an operation part for receiving various instructions from an operator, and a transmission/reception module 228 as a main control communication part for communicating with the inside and outside of the apparatus 1. The operator includes a device operator, a device manager, a device engineer, a maintenance engineer and a worker. The main control part 220 includes a CPU (Central Processing Unit) 224 as a processing part and a memory (RAM, ROM, etc.) 226 as a transitory storage part and is configured as a computer having a clock function (not shown).

In the hard disk 222 are stored a recipe file such as a recipe in which processing conditions and processing procedures of a substrate are defined, a control program file for executing the recipe file, a parameter file in which parameters for executing the recipe are defined, an error processing program file, an error processing parameter file, various screen files including an input screen for inputting process parameters, various icon files (none of which are shown), and the like.

An operation screen for operating the apparatus 1 is displayed on the operation display part 227 as a display device. The operation screen of the operation display part 227 is a touch panel using liquid crystal, for example. The operation display part 227 may include a display part such as a liquid crystal display, a user interface part including devices such as a keyboard and a mouse, etc.

The operation display part 227 includes an operation part and a display part. Operation buttons as input parts for inputting operation instructions to the substrate transfer system 211A and a substrate processing system (the heating mechanism 212A, the gas exhaust mechanism 212B and the gas supply system 212C) can be formed on the operation screen of the operation display part 227.

The operation display part 227 receives an instruction input by the operator from the operation screen and transmits the input instruction data to the operation part 201. In addition, the operation display part 227 receives an instruction to execute a file of a recipe deployed on the memory 226 or the like, or an optional substrate processing recipe (also referred to as a process recipe) among a plurality of recipes stored in the main control storage part 222 and transmits it to the main control part 220.

A switching hub or the like is connected to the main control communication part 228 and the operation part 201 is configured to exchange data with an external computer and other controllers in the apparatus 1. Further, the operation part 201 transmits device data such as the state of the apparatus 1 to an external upper level computer, for example, a host computer, via a network (not shown).

(Substrate Processing Method)

Next, a substrate processing method having a predetermined processing process, which is performed using the apparatus 1 according to the present embodiment, will be described. The predetermined processing process used herein is exemplified with a case where a substrate processing process (here, a film forming process) which is one of the processes of manufacturing a semiconductor device is performed.

In performing the substrate processing process, a substrate processing recipe (process recipe) corresponding to the substrate processing process to be performed is downloaded from, for example, the operation part 201 to a memory such as a RAM in the process control part 212. As a result, during the recipe execution, the operation part 201 can issue an operation instruction to the process control part 212 and the transfer control part 211. The substrate processing process includes at least a loading step, a film forming step, an unloading step and a recovering step. A transferring step (which may include a step of loading a substrate into the apparatus 1) may be included in the substrate processing process.

(Transferring Step)

An instruction to drive the substrate transfer mechanism 24 is issued from the operation part 201 to the transfer control part 211. Then, in accordance with the instruction from the transfer control part 211, the substrate transfer mechanism 24 starts a process of transferring the substrate 18 from the pod 9 on a transfer stage 21 as a mounting table to the boat 26. This transferring process is performed until charging of all scheduled substrates 18 in the boat 26 is completed.

(Loading Step)

When the charging of the substrate 18 in the boat 26 is completed, the boat 26 is moved up with the substrate 18 held in the boat 26 by the boat elevator 32 being operated in accordance with an instruction from the transfer control part 211. The boat 26 is charged in the process chamber 29 formed in the processing furnace 28. When the boat 26 is completely charged, the lid 34 air-tightly closes the lower end portion of a manifold as a furnace opening flange installed in the lower portion of the processing furnace 28.

(Film Forming Step)

A pressure regulator is feedback-controlled based on pressure information measured by the pressure sensor in accordance with an instruction from the pressure controller 212b so that the process chamber 29 has a predetermined film forming pressure (degree of vacuum). Further, the state of electrical conduction to the heater is feedback-controlled based on temperature information detected by the temperature sensor as a temperature detector in accordance with an instruction from the temperature controller 212a so that the process chamber 29 has a predetermined film forming temperature.

Subsequently, the boat 26 and the substrate 18 begin to be rotated by the rotation mechanism in accordance with an instruction from the transfer control part 211. Then, with the predetermined pressure and the predetermined temperature, a predetermined gas (processing gas) is supplied to the plurality of substrates 18 held by the boat 26 to perform a predetermined process (for example, a film forming process).

(Unloading Step)

When the film forming step for the substrate 18 mounted on the boat 26 is completed, the rotation of the boat 26 and the substrate 18 by the rotating mechanism is stopped in accordance with an instruction from the transfer control part 211, the lid 34 is lowered by the boat elevator 32 to open the lower end portion of the manifold, and the boat 26 holding the processed substrate 18 is unloaded out of the processing furnace 28.

(Recovering Step)

The boat 26 holding the processed substrate 18 is quite effectively cooled by the clean air 36 blown out from the clean unit 35. Then, for example, when the boat 26 is cooled to 150 degrees C. or less, the processed substrate 18 is discharged from the boat 26 and is transferred to the pod 9, and then a new unprocessed substrate 18 is transferred to the boat 26.

By repeating the above-described steps by executing the process recipe, the apparatus 1 according to the present embodiment can form a film on the substrate 18 with a high throughput.

(Configuration of Substrate Processing System)

Figure 5:
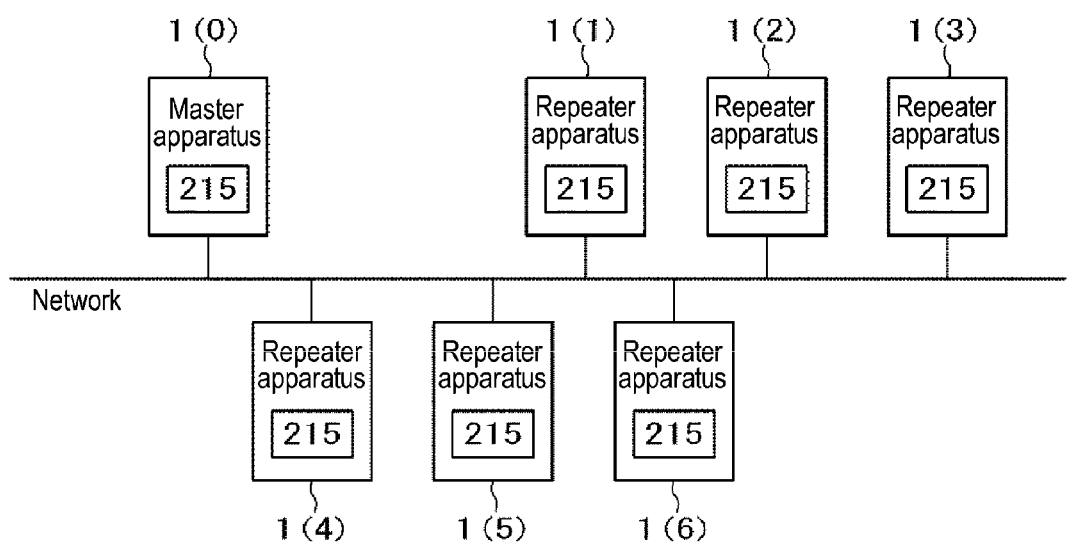
FIG. 5 is a view showing a configuration of a substrate processing system suitably used in one embodiment of the present disclosure.

FIG. 5 is a view showing a configuration of the substrate processing system used in this embodiment. As shown in FIG. 5, in the substrate processing system, a master apparatus 1(0) and repeater apparatuses 1(1) to 1(6) are interconnected by a network. In the example of FIG. 5, six repeater apparatuses 1(1) to 1(6) are shown, but the number of repeater apparatuses 1(1) to 1(6) is not limited to six.

The master apparatus 1(0) is a substrate processing apparatus having standard device data and files. The master apparatus 1(0) and the repeater apparatuses have the same hardware configuration as the apparatus and have the device management controller 215. The master apparatus 1(0) is, for example, the first machine of the apparatus 1 adjusted such that the apparatus data is proper. The repeater apparatuses are, for example, the second or subsequent machines of the apparatus 1, receive a copy of the device data or files of the master apparatus 1(0) from the master apparatus 1(0) via the network, and store the received copy in storage parts of the repeater apparatuses.

In the present embodiment, the device management controller 215 is installed in the apparatus 1. In addition, by interconnecting the device management controllers 215 installed in the master apparatus 1(0) and each of apparatuses 1 via a network, the apparatuses 1 can share the device data and files of the master apparatus 1(0). In addition, since the apparatuses 1 can share the device data and files of the master apparatus 1(0), file matching, abnormal factor analysis, device status monitoring, etc. can be easily performed.

Thereby, each apparatus 1 is able to monitor whether the apparatus 1 is in an operation state in which the stable operation of the apparatus 1 can be achieved. In other words, it is possible to monitor whether or not the state in which the apparatus 1 can be normally operated can be continued and whether or not the apparatus 1 is close to a failure state, and the like.

File matching is a process in which the apparatus 1 matches various pieces of information of the apparatus 1 with various pieces of information of the master apparatus 1(0), more specifically, it is to copy the files of the master apparatus 1(0) or compare and collate the various pieces of information of the apparatus 1 with the files of the master apparatus 1(0). The file matching does not require a USB memory to be used for copying of the device data and has an advantage that a maintenance engineer of the apparatus maker can easily perform a work.

(Functional Configuration of Device Management Controller 215)

Figure 6:
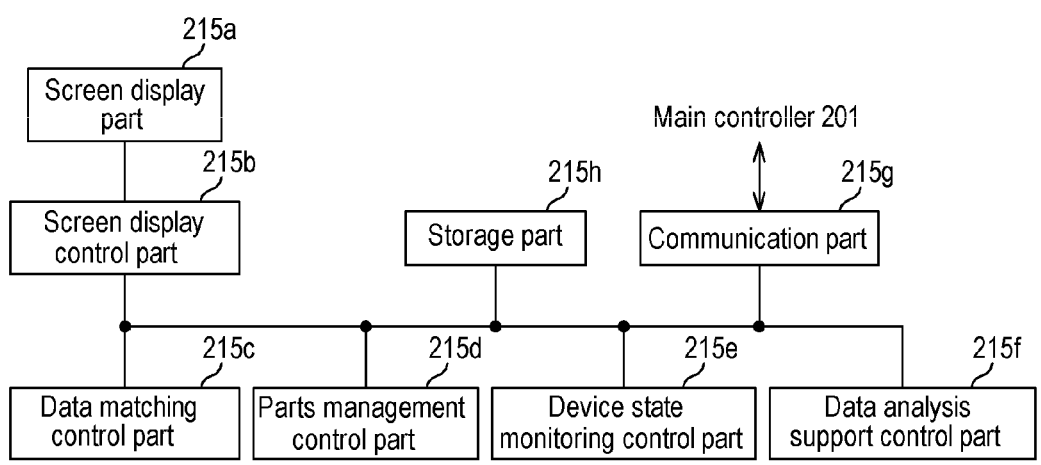
FIG. 6 is a view for explaining a functional configuration of a device management controller suitably used in one embodiment of the present disclosure.

FIG. 6 is a view for explaining a functional configuration of the device management controller used in this embodiment. The device management controller 215 as a health checking controller for checking the health condition of the apparatus 1 (the comprehensive operation state of the apparatus) is configured to derive information evaluating various operation states of the apparatus 1 (for example, information that is an index of the stable operation of the apparatus 1 derived from at least one of data indicating a result obtained by monitoring the matching state of the device data between the apparatus 1 and the master apparatus 1(0), the amount of time-lapse in the device data of the apparatus 1, the deterioration state of parts constituting the apparatus 1, the occurrence state of failure of the apparatus 1, and the like).

The device management controller 215 may be configured to quantify information evaluating the comprehensive operation state of the apparatus 1 and indicate the results for easy understanding on, for example, an integration screen (FIGS. 8 and 18) of the operation state of the apparatus 1 to be described later. Alternatively, the device management controller 215 may be configured to monitor the operating state of the apparatus 1 based on a quantified numerical value of the information evaluating the comprehensive operation state of the apparatus 1, and issue an alarm (for example, emit an alarm sound or display an alarm) when the stable operation cannot be performed or when there is a possibility that the stable operation cannot be performed.

Further, the device management controller 215 is configured such that four functions (data matching, parts management, apparatus state monitoring and data analysis support) (which will be described later) required to derive the index of the stable operation of the apparatus 1 can be operated via the operation display part 227 of the apparatus 1.

As shown in FIG. 6, the device management controller 215 includes a screen display part 215*a*, a plurality of control parts selected from a group consisting of a screen display control part 215*b*, a data matching control part 215*c*, a parts management control part 215*d*, a device state monitoring control part 215*e* and a data analysis control part 215*f*, a communication part 215*g* for exchanging the device data of the apparatus 1 with the operation part 201, and a storage part 215*h* storing at least the device data. In the present embodiment, the four functions (data matching, parts management, apparatus condition monitoring and data analysis support) are executed by different control parts, but all the functions may be included in a single control part. Further, in the present embodiment, the device management controller 215 is not limited to the four functions but may provide only a plurality of functions.

The device management controller 215 includes a plurality of control parts selected from a group consisting of the data matching control part 215*c* for determining the validity of facility data supplied from a factory facility, the parts management control part 215*d* for monitoring the degree of deterioration and wear of the parts constituting the apparatus, the device state monitoring control part 215*e* for monitoring the integrity of the device data obtained from the operation state of the parts constituting the apparatus, and the data analysis control part 215f for monitoring the occurrence state of failure information of the apparatus.

The device management controller 215 is also configured to derive information evaluating the operation state of the apparatus based on a plurality of monitoring result data selected from a group consisting of maintenance timing monitoring result data acquired by the parts management control part 215d, device state monitoring result data acquired by the device state monitoring control part 215e, and utility monitoring result data determined by the data matching control part 215c. In addition, the main control storage part 222 and the transitory storage part 226 may be used in place of the storage part 215h.

As described above, the monitoring result data include the device state monitoring result data indicating a result of comparison between device data designated in advance and standard data corresponding to the device data, the utility monitoring result data indicating a result of comparison between facility data held by the apparatus and reference data as the reference of the facility data, the maintenance timing monitoring result data indicating a result of comparison between parts data indicating the state of parts of the device data and threshold data indicating a maintenance timing, and the failure information monitoring result data indicating the occurrence frequency of failure information data within a predetermined period, all of which may collectively be referred to as monitoring result data.

The device management controller 215 is configured to implement the data matching control part 215c by executing a data matching program before the start of a process, e.g., the startup of the apparatus 1, implement the parts management control part 215d by executing a parts management program during the operation of the apparatus 1, and implement the device state monitoring control part 215e by executing a device state monitoring program. In addition, the device management controller 215 is configured to implement the data analysis control part (alarm monitoring control part) 215f by executing an alarm monitoring program or a data analysis program while the apparatus 1 is being operated or stopped and implement the screen display control part 215b by executing a screen display program.

The device management controller 215 has the same hardware configuration as the operation part 201. The device management controller 215 may have a function as a database that collects and stores device data in the storage part 215h and may process the stored device data into a graph and display it on the screen display part 215a or the operation display part 227.

In the present embodiment, the device management controller 215 is provided separately from the operation part 201 having the substrate processing function and the upper level reporting function, but the present disclosure is not limited to such an embodiment. For example, the operation part 201 may monitor the device data including failure information data such as parts data on part lifetime, device state monitoring data on device state monitoring, alarm occurrence information data on alarm monitoring, and may have a function of data matching between devices. Furthermore, in the present embodiment, the four functions (data matching, parts management, apparatus condition monitoring and data analysis support) of the device management controller 215 may be incorporated in any one of the operation part 201, the transfer control part 211 and the process control part 212.

(Screen Display Part 215a)

The screen display part 215a is configured to display result data (described later) of various data on the integration screen (FIGS. 8 and 18) or the like of the operation state of the apparatus 1 to be described later. However, when an external terminal or the operation display part 227 is used as a display device, the screen display part 215a may be omitted. The operation display part 227 may be used instead of the screen display part 215a, or a terminal or the like connected for referring to a screen may replace the screen display part 215a.

(Screen Display Control part 215b)

By executing a screen display program, the screen display control part 215b processes various data of the integration screen of the operation state of the apparatus 1 into data for screen display, creates and updates the screen display data, and displays the updated data on the operation display part 227.

(Screen Display Control Function)

Next, a screen display control function in the present embodiment, that is, a processing flow of the screen display program executed by the screen display control part 215b of the device management controller 215 will be described with reference to FIG. 7. In the present embodiment, a function of displaying the integration screen (FIGS. 8 and 18) of the operation state of the apparatus 1 to be described later will be described.

Figure 7:
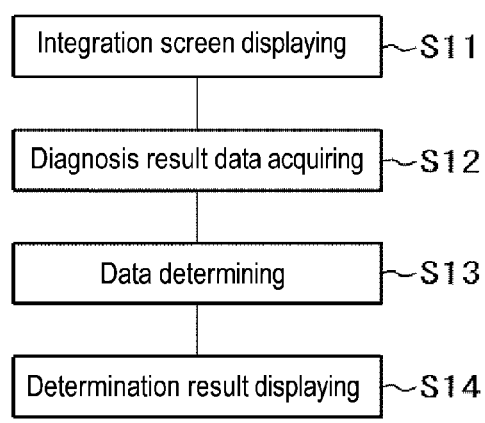
FIG. 7 is a view for explaining a process flow of an integration screen display program according to one embodiment of the present disclosure.

As shown in FIG. 7, in this screen display program, an integration screen displaying step (step S11 in FIG. 7), a monitoring result data acquiring step (S12), a data determining step (S13) and a determination result displaying step (S14) are performed in order. In this embodiment, the screen display program is not limited to this order of steps, but may be configured so that, for example, the integration screen displaying step (S11) is performed after the data determining step (S13).

Figure 18:
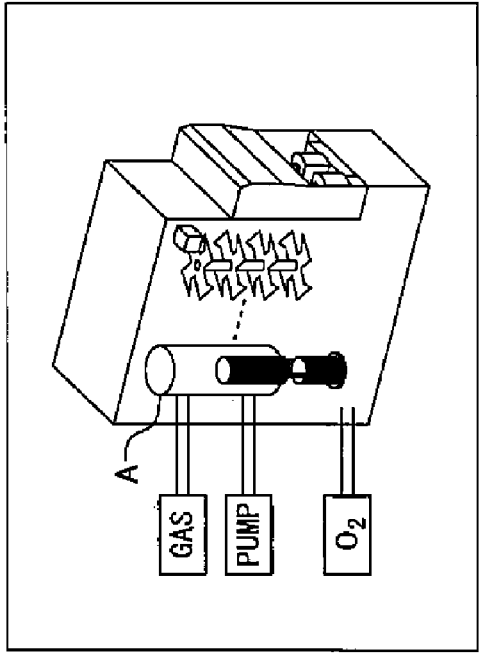
FIG. 18 is a view showing a display example of an integration screen of the operation state of the apparatus according to one embodiment of the present disclosure.

First, the integration screen displaying step (S11) is executed. Thereby, preselected screens as shown in FIGS. 8 and 18 are displayed on an operation screen.

Next, in the monitoring result data acquiring step (S12), the screen display control part 215b acquires monitoring result data to be used for displaying as an integration screen on the operation display part 227 in the present embodiment, among the monitoring result data output by the four control parts (the data matching control part 215c, the parts management control part 215d, the device state monitoring control part 215e and the data analysis control part 215f) shown in FIG. 6, from the storage part 215h.

Next, the data determining step (S13) is executed to determine and score the monitoring result data acquired in S12. In the data determining step (S13), it is determined whether the result data outputted by the data matching control part 215c, the parts management control part 215d, the device state monitoring control part 215e and the data analysis control part 215f are normal or abnormal and to what extent there is an abnormality.

The scoring of the monitoring result data determined to be abnormal is calculated for each of the monitoring result data outputted by the data matching control part 215c, the parts management control part 215d, the device state monitoring control part 215e and the data analysis control part 215f, based on a score obtained according to a predetermined rule.

Since the score is weighted by each control part, the score of the monitoring result data determined as abnormal by the device state monitoring control part 215e is higher than the score of the monitoring result data determined as abnormal by the parts management control part 215d.

Next, in the determination result displaying step (S14), the screen display control part 215b updates and displays the integration screen of the operation state of the apparatus 1 displayed in S11 from a result of the determination and a result of the scoring in the data determining step (S13).

(Data Matching Control Part 215c)

The data matching control part 215c collates facility data on the customer utility of the apparatus 1 with reference data that is a reference value (width) shown in an initial value table for confirmation of a customer utility range at the time of setup of the apparatus 1 (for example, when the apparatus 1 is initially activated). The data matching control part 215c compares a measured value of an item related to the utility of the apparatus 1 with the reference data and determines whether the measure value is abnormal or normal based on a deviation from the reference data. This function is incorporated in the device management controller 215 at the time of installation of the apparatus 1 so as to monitor the facility data. The facility data of the apparatus 1 may be collated at the time of installation of the apparatus 1 with an actual measured value of the master apparatus 1(0) as reference data.

The data matching control part 215c confirms whether or not the facility data on the utility falls within a range of reference value shown in the initial value table or within ±3% of the present value of the master apparatus, and stores the facility data, as utility monitoring result data, in the storage part 215h. More specifically, the data matching control part 215c stores the facility data diagnosed as deviating from the reference data and the number of facility data deviating from the reference data, as utility monitoring result data, in the storage part 215h. At this time, the data matching control part 215c may store data deviated from the reference value and data deviated from the present value of the master apparatus in such a manner that they can be distinguished from each other.

In addition, by comparing the facility data with the reference data before starting the process of the apparatus 1, the data matching control part 215c can prevent the process recipe from being executed while the facility data is in an abnormal state.

In addition, the monitoring of the facility data performed before the start of the process of the apparatus 1 is not performed only by the data matching control part 215c but may be performed by a control part other than the data matching control part 215c, for example, the device state monitoring control part 215e.

Furthermore, by executing the data matching program, the data matching control part 215c is configured to execute a file matching function to make a copy and comparison between a file of the apparatus 1 received from the operation part 201 and a file of the master apparatus 1(0). Details of this file matching function will be described later.

(Parts Management Control Part 215d)

By executing the parts management program, the parts management control part 215d executes the maintenance timing monitoring function to update the parts data stored in the storage part 215h based on the parts data (for example, the frequency and time of use of parts) of the apparatus 1 received from the operation part 201. In addition, the parts management control part 215d is configured to construct a mechanism for predicting a timing at which the number of uses of parts or the time of use of parts reaches a replacement value recommended by a maker based on a change in the number of past uses of parts and the time of past use of parts.

A processing flow of maintenance timing monitoring by the parts management control part 215d in the present embodiment will be described below with reference to FIG. 13.

Figure 13:
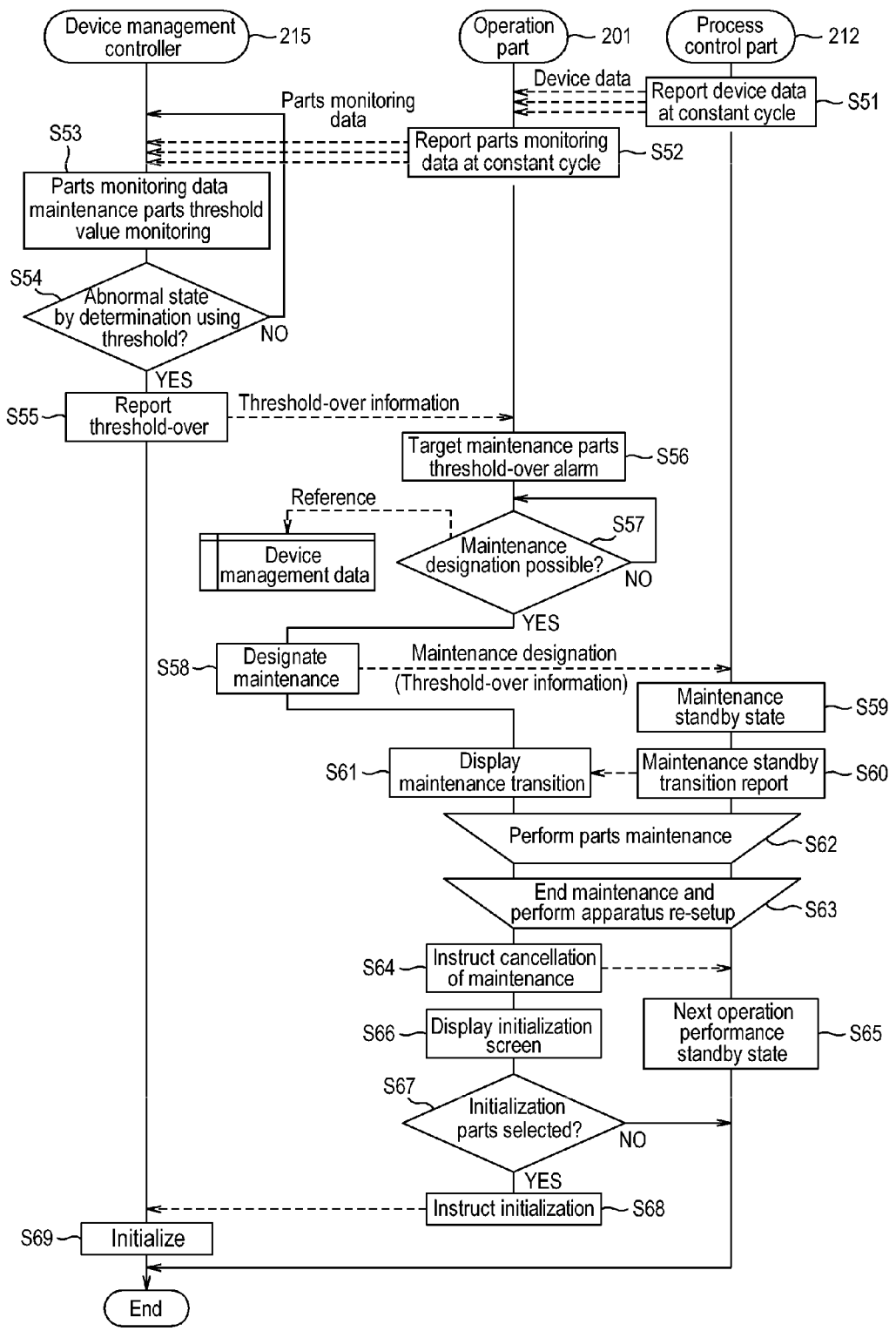
FIG. 13 is a flow chart of maintenance parts management according to one embodiment of the present disclosure.

As shown in FIG. 13, device data is reported from the process control part 212 to the operation part 201 at a constant cycle (step S51 in FIG. 13). The operation part 201 extracts parts data of parts as a monitoring target from the collected device data and reports this extracted parts data to the device management controller 215 (the parts management control part 215d) at a constant cycle (S52). The parts management control part 215d may extract the parts data from the device data.

The parts management control part 215d compares the collected parts data (device data) with a threshold value set for each parts data (S53). This threshold value may be a value recommended by a parts maker or may be a value obtained by adding or subtracting some to/from a recommended value according to the usage record. When the parts data does not exceed this threshold value (No in S54), the process returns to S53 and a result (normal) of the comparison between the parts data and the threshold value corresponding to the parts data is stored as maintenance timing monitoring result data in the storage part 215h.

On the other hand, when the parts data exceeds this threshold value (Yes in S54), information indicating that the parts data exceeds this threshold value is communicated to the operation part 201 and a result (abnormal) of the comparison between the parts data and the threshold value corresponding to the parts data is stored as maintenance timing monitoring result data in the storage part 215h (S55). Then, the operation part 201 displays on the operation display part 227 an alarm indicating that the parts data of maintenance target parts exceeds the threshold value (S56).

The operation part 201 refers to the device management data stored in advance in the main control storage part 222 to determine whether or not the state of a module constituted by maintenance parts whose parts data exceeds the threshold value is in a state where maintenance designation is possible, such as a standby state for the next operation execution (S57). When it is in a state where maintenance transition is possible (Yes in S57), maintenance designation is instructed (S58). When maintenance transition is not possible (No in S57), the process waits until maintenance transition becomes possible.

Upon receiving the maintenance designation from the operation part 201, the process control part 212 transfers the state of the corresponding module to the maintenance standby state (S59), notifies the operation part 201 of the transition to the maintenance standby state (S60), and indicates that the next operation is impossible in this module. It should be noted that a module used herein is a constituent of the apparatus 1 and does not always match with "Module" in FIG. 8.

After instructing the maintenance in S58, upon receiving the transition to the maintenance standby state from the process control part 212, the operation part 201 designates maintenance of a maintenance target module (S61).

After the maintenance designation, the maintenance is executed on a process module designated for maintenance (S62). For example, when the cumulative film thickness of the process module is abnormal, a restoring process such as execution of a cleaning recipe or replacement of the boat 26 is performed. After the restoring process, a predetermined setup work is performed and the maintenance is completed (S63).

After the target module is subjected to the maintenance, the operator designates cancellation of the maintenance from the operation screen of the operation display part 227. Then, the operation part 201 issues a command for cancellation of the maintenance to the process control part 212 (S64). The process control part 212 changes the state of the target module to the standby state for the next operation execution and sets it as a module usable by the process control part 212 (S65).

The operation part 201 displays a screen for prompting the initialization of the parts data of the parts as the maintenance target (S66) and determines whether or not the parts data of the parts as the maintenance target is initialized (S67). When there is no need to initialize the parts data (No in S67), the process of this flowchart is ended. When parts data need to be initialized (Yes in S67), initialization target parts are selected.

When the initialization target parts are selected, the operation part 201 instructs the parts management control part 215*d* to initialize the parts data of maintenance target parts related to the module subjected to the maintenance (S68). The parts management control part 215*d* initializes the initialization target parts data based on the instruction from the operation part 201 (S69).

For example, a monitoring value (for example, the number of uses) of the initialization target parts data is cleared to zero (sometimes also referred to as reset). The operation part 201 may be configured to receive an input of the operator from the operation display part 227 and clear the monitor value of the parts data to zero, which is more efficient in grasping the operative condition of parts from the viewpoint of monitoring the parts lifetime.

In addition, with this initialization, the parts management control part 215*d* is configured to perform a process of returning the maintenance timing monitoring result data, which is determined as abnormal as a result of the threshold value comparison in S53, to normal.

According to the parts management process of the parts management control part 215*d* in the present embodiment, since the parts management control part 215*d* can grasp the recommended maintenance timing before failure of the maintenance target parts, it is possible to achieve more stable operation of the apparatus 1 and a reduced lot-out ratio of product substrates.

According to the parts management process of the parts management control part 215*d* in the present embodiment, since the parts management control part 215*d* switches the operation display part 227 to the parts maintenance screen of a target module and initializes the parts data of the maintenance target parts related to the target module, it is possible to reliably cancel the maintenance designation in a case of returning the apparatus 1 to a production-capable module after the maintenance.

According to the parts management process of the parts management control part 215*d* in the present embodiment, since the parts management control part 215*d* can graphically display the parts data (for example, the number of uses) of the maintenance target parts on a time basis on the operation display part 227, it is possible to predict the maintenance timing of a monitor value of monitoring target parts on the screen of the operation display part 227 and to prepare the maintenance target parts in advance.

(Device State Monitoring Control Part 215*e*)

The device state monitoring control part 215*e* executes a device state monitoring function by executing the device state monitoring program. The device state monitoring control part 215*e* receives the device data of the apparatus 1 every moment from the operation part 201, updates the device data stored in the storage part 215*h*, and monitors the device data of the apparatus 1 every moment based on, for example, standard data acquired from the master apparatus 1(0), that is, standard data that is to be targeted by the apparatus 1 (for example, a waveform of a reaction chamber temperature over time, the upper limit value thereof, the lower limit value thereof, etc.). That is, the device data of the apparatus 1 is monitored by comparing it with the standard data every moment. As a result, it is possible to realize monitoring of the state of the apparatus with fewer false alarms.

Next, the device state monitoring program executed by the device state monitoring control part 215*e* will be described with reference to FIGS. 14 and 15. The device state monitoring program is stored in a memory (for example, the storage part 215*h*) of the device management controller 215 and implements the device state monitoring control part 215*e*.

Figure 14:
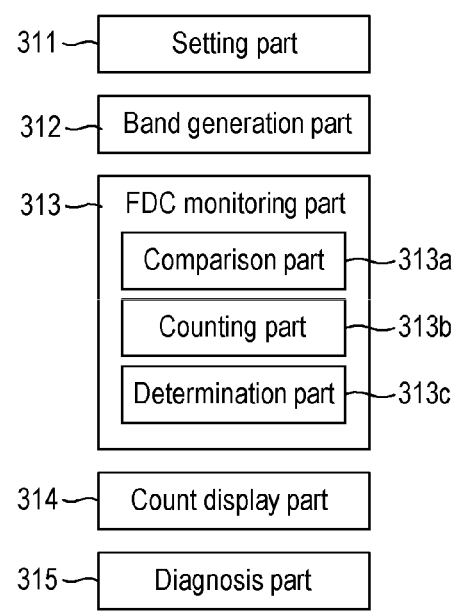
FIG. 14 is a view showing a functional configuration of a device state monitoring control part according to one embodiment of the present disclosure.

As shown in FIG. 14, the device state monitoring control part 215*e* includes a setting part 311, a band generation part 312, a fault detection & classification (FDC) monitoring part 313, a count display part 314 and a diagnosis part 315. The FDC monitoring part 313 includes a comparison part 313*a*, a counting part 313*b* and a determination part 313*c*.

The setting part 311 instructs the band generation part 312, the FDC monitoring part 313 and the diagnosis part 315 to set band management specified by an input (operation command input, etc.) from the operation display part 227.

The band generation part 312 generates a band based on standard data set by the setting part 311, an upper limit designated value and a lower limit designated value. The band used herein refers to a range determined by giving a width to a waveform by standard data (for example, master data of the master apparatus 1(0) in data of a standard apparatus). Specifically, the band refers to a range determined by designating an upper limit value and/or a lower limit value based on values of data points constituting the standard data.

In addition, device data specified as a monitoring target by the device state monitoring control part 215*e* is device state monitoring data, and data indicating a result of monitoring the device state monitoring data by the device state monitoring control part 215*e* is device state monitoring result data. Hereinafter, the standard data will be described as master data.

The FDC monitoring part 313 compares the band generated by the band generation part 312 with the device data (device state monitoring data) generated every moment from the apparatus 1 and determines that the device data is abnormal when the device data deviates from the band for more than a predetermined number of times. Further, upon detecting the abnormality, the FDC monitoring part 313 displays on the operation display part 227 the fact that the abnormality is detected. Here, a data point that deviates from the band in comparison between the band and the device data is called a deviation point.

The count display part 314 is configured to display on the operation display part 227 the number of deviation points counted by the FDC monitoring part 313 for each batch process. The diagnosis part 315 diagnoses the statistics including the number of deviation points using an abnormality diagnosis rule. Upon diagnosing the statistics as abnormal, the count display part 314 displays on the operation display part 227 the fact that the abnormality is detected.

(FDC Monitoring Part)

The FDC monitoring part 313 monitors the device data by comparing the device data received from the operation part 201 with the band generated based on the master data serving as a criterion for determination of the device data.

The comparison part 313a compares whether or not the device data is out of the band using an interval (for example, 1 second) between data points constituting the master data and stores a result of the comparison in the storage part 215h. The comparison part 313a repeats the comparison between the data points of the device data and the band until the designated device data is not acquired, regardless of the number of data points which are out of the band.

When the comparison part 313a completes the comparison of all the data points for the set device data, the counting part 313b counts the total number of points that deviate from the band based on the comparison result stored in the storage part 215h. Further, the counting part 313b associates a value of the device data, a value of the master data, a band corresponding to the master data (the upper limit value and the lower limit value for the master data), and a counted count value, and stores them as related data in the storage part 215h.

When the count value counted by the counting part 313b exceeds a predetermined value, the determination part 313c determines that the device data is abnormal. When the counted count value is equal to or smaller than the predetermined value, it is determined that the device data is normal. A result of the determination is stored as device state monitoring result data in the storage part 215h.

Figure 15:
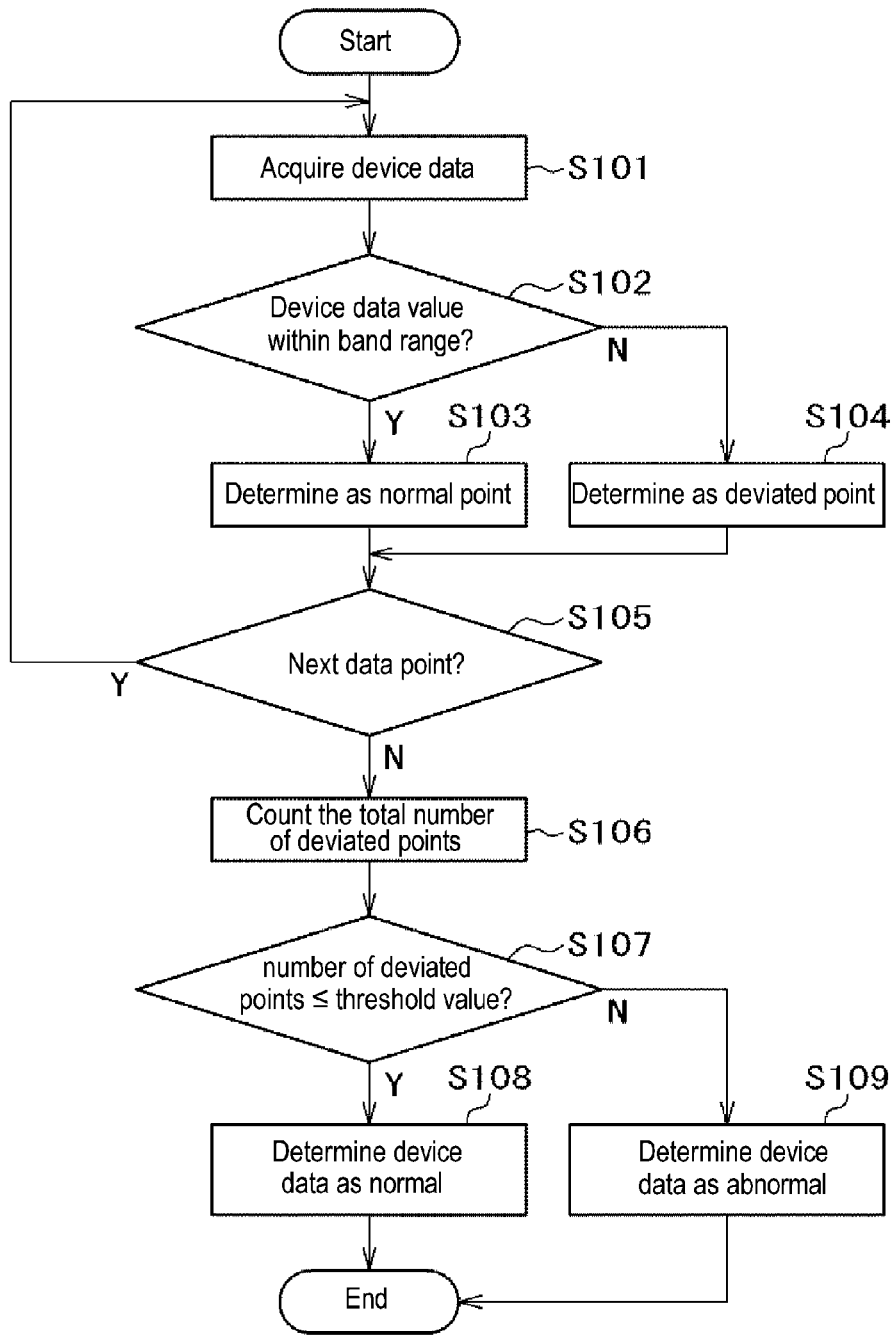
FIG. 15 is a flow chart of device state monitoring according to one embodiment of the present disclosure.

FIG. 15 is a flowchart of monitoring by the FDC monitoring part 313. Hereinafter, a flow of monitoring by the FDC monitoring part 313 will be described with reference to FIG. 15.

In step S101, the comparison part 313a reads from the storage part 215h a value of device data (device state monitoring data) of an item to be monitored (a diagnosis target item).

In step S102, the comparison part 313a uses a band generated based on the master data serving as the criterion for determination of a monitoring target device data (device state monitoring data) and compares the device data value acquired in the step S101 with the band. Specifically, the comparison part 313a compares whether or not the device data value exceeds an upper limit value or a lower limit value set as the band.

As a result of the comparison, when the device data value is within the band range, that is, when the device data value is equal to or smaller than the upper limit value and equal to or larger than the lower limit value, the process proceeds to step S103. On the other hand, as a result of the comparison, when the device data value is not within the band range, that is, when the device data value is larger than the upper limit value or is smaller than the lower limit value, the process proceeds to step S104.

In the step S103, the comparison part 313a determines that the device data value acquired in the step S101 is a normal point, and stores a comparison result (OK) in the storage part 215h.

On the other hand, in the step S104, the comparison part 313a determines that the device data value acquired in the step S101 is an abnormal deviation point, and stores a comparison result (NG) in the storage part 215h.

In step S105, the comparison part 313a checks whether the next data point is stored as device data in the storage part 215h. If the next data point is stored, the process returns to the step S101. If the next data point is not stored, the process proceeds to step S106.

In the step S106, the counting part 313b counts the number of deviation points determined in the step S104 based on the comparison result stored in the storage part 215h.

In step S107, the determination part 313c compares the count value counted in the step 106 with a predetermined threshold value. When the count value is equal to or smaller than the threshold value, the process proceeds to step S108. When the count value is larger than the threshold value, the process proceeds to step S109.

In the step S108, the determination part 313c determines that the device data is normal, and ends the monitoring of the device data.

In the step S109, the determination part 313c determines that the device data is abnormal, displays on the operation display part 227 the fact that the abnormality is detected, and ends the monitoring of the device data.

In this process flow, the device data and the comparison result may be stored in the main control storage part 222 instead of the storage part 215h.

While the band management as one of the FDCs executed by the device state monitoring control part 215e has been described above, the conventional FDC is U.FDC (User FDC) in which data focused on the user side (device maker side) are a monitoring target, which is unsuitable for monitoring concerning the wear rate of parts of the substrate processing apparatus 1. That is, U.FDC using SPC is insufficient as a function to monitor the device state. Therefore, the present disclosure suggests a technique for monitoring the device state using a unique FDC (S. FDC (Special FDC)) developed by the present inventors, as will be described below.

(Zero Point Correction of MFC (Mass Flow Controller))

An example of monitoring the zero point correction state of an MFC as S.FDC will be described with reference to FIG. 16. This monitoring is performed by the device state monitoring control part 215e. This monitoring allows the device state monitoring control part 215e to predict a batch to be subjected to the zero point correction by obtaining the slope of a MFC flow rate voltage with respect to the batch processing number. The batch used herein refers to a period taken from charging of the wafer 18 in the boat 26 to discharging of the wafer 18 processed in the process chamber 29 from the boat 26.

Figure 16:
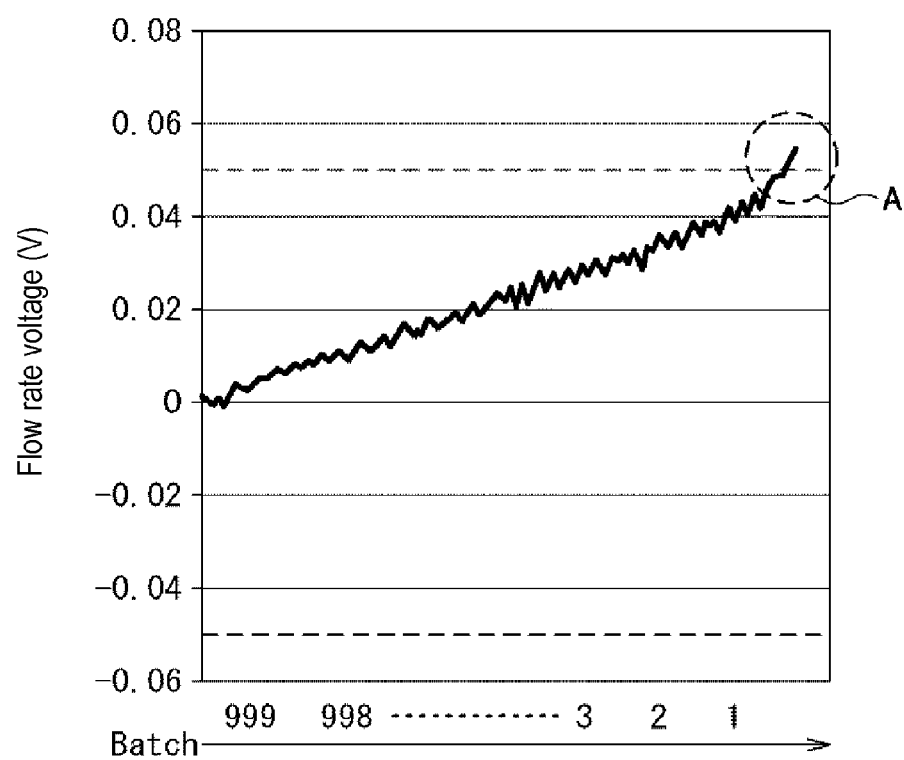
FIG. 16 is a view for explaining device state monitoring according to one embodiment of the present disclosure.

The vertical axis in FIG. 16 represents a flow rate voltage output from an MFC when the flow rate of a gas flowing through the MFC is zero. This flow rate voltage indicates the magnitude of the flow rate of the gas flowing through the MFC and should originally be zero. The horizontal axis in FIG. 16 represents the number of substrate processing batches of the apparatus 1. Batch processing of the apparatus 1 has been performed in the order of batch Nos. 999, 998, . . . , 3, 2, 1.

It can be seen from FIG. 16 that the MFC flow rate voltage increases as the batch processing is repeated, that is, the zero point of the MFC shifts. The zero point correction is to correct this shift. The MFC flow rate voltage to be monitored by the device state monitoring control part 215e is also included in the device state monitoring data. Accordingly, similarly, data indicating a result of comparison between the MFC flow rate voltage and a threshold value (an upper limit value) thereof is included in the device state monitoring result data.

In this example, the threshold value (the upper limit value) of the MFC flow rate voltage for zero point correction is set to 0.05V. The MFC flow rate voltage is monitored only for an MFC related to the quality of a substrate among a number of MFCs in the apparatus 1. Although not described here, the zero point correction can also be applied to a pressure sensor.

The device state monitoring control part 215e acquires the MFC flow rate voltage at a timing before the start of a recipe and at a timing when the recipe is being executed and the flow rate of a gas flowing through the MFC is zero, stores the acquired MFC flow rate voltage in the storage part 215h, and compares the acquired flow rate voltage with a threshold value thereof. Then, when the acquired flow rate voltage exceeds the threshold value, data indicating that the MFC flow rate voltage to be monitored is abnormal is stored as device state monitoring result data in the storage part 215h and, after completion of the recipe, the zero point correction is performed. The MFC flow rate voltage may be stored in the main control storage part 222 instead of the storage part 215h.

The timing when the flow rate of the gas flowing through the MFC is zero is when both of an opening/closing valve on the primary side (gas flow upstream side) of the MFC and an opening/closing valve on the secondary side (gas flow downstream side) of the MFC are closed. The device state monitoring control part 215e calculates in advance the timing at which the MFC flow rate becomes zero during the recipe execution, that is, the timing at which both the primary side valve and the secondary side valve are closed and, at that timing, acquires the MFC flow rate from the MFC and compares it with the threshold value thereof.

In addition, the device state monitoring control part 215e is configured to compare the maximum flow rate voltage among a plurality of MFC flow rate voltages acquired in one batch process for one MFC with the threshold value. Therefore, if the maximum flow rate voltage exceeds the threshold value even once, the device state monitoring control part 215e determines that the MFC flow rate voltage is abnormal, and stores in the storage part 215h data indicating that the MFC flow rate voltage is abnormal. When the acquired flow rate voltage does not reach the threshold value, data indicating that the flow rate voltage of the MFC being monitored is normal is stored as device state monitoring result data in the storage part 215h.

Further, the device state monitoring control part 215e stores the maximum flow rate voltage among the plurality of MFC flow rate voltages acquired in one batch process for one MFC in the storage part 215h. Then, the device state monitoring control part 215e obtains the slope of the MFC flow rate voltage with respect to the batch number (the horizontal axis in FIG. 16) for each batch or plural batches, predicts from the slope a batch in which the MFC flow rate voltage reaches the threshold value, that is, a batch to be subjected to the zero point correction, and displays a result of the prediction on the operation display part 227. For example, the result of the prediction is displayed as indicated by a broken circle A in FIG. 16. The circle A indicates a batch in which the MFC flow rate voltage reaches the threshold value.

Instead of predicting the batch in which the MFC flow rate voltage reaches the threshold value, the device state monitoring control part 215e may merely send data of the graph shown in FIG. 16 to the screen display control part 215b. In this case, the screen display control part 215b displays the graph shown in FIG. 16 on the operation display part 227 based on the graph data received from the device state monitoring control part 215e. Then, an operator such as a maintenance engineer watches the graph to determine a batch to be subjected to the zero point correction.

The device state monitoring control part 215e performs such MFC flow rate voltage monitoring for all MFCs related to the quality of the substrate. Further, the above-described MFC flow rate voltage monitoring may be incorporated into a recipe.

According to the device state monitoring process of the device state monitoring control part 215e in the present embodiment, since the device state monitoring control part 215e uses FDC for a plurality of device data (reaction chamber temperature, pressure, etc.) to perform abnormality diagnosis based on device data to be monitored (device state monitoring data), it is possible to realize more accurate monitoring of the device state and it is easy to grasp abnormality factors at a stage before the abnormality comes to the surface.

In addition, since the device state monitoring control part 215e is configured to be able to use S. FDC which is a data abnormality diagnosis method independently created by the maker of the apparatus 1, as well as U.FDC which is a known data abnormality diagnosis method used by a user of the apparatus 1, it is easy to grasp abnormal factors closely in a wider range.

(Data Analysis Control Part 215f or Alarm Monitoring Control Part)

The data analysis control part 215f executes a data analysis program to display on the operation display part 227 analysis data for a maintenance engineer to analyze the cause of abnormality (e.g., film thickness abnormality of a product substrate). Further, the data analysis control part 215f functions as an alarm monitoring control part, as will be described later.

(Analysis Support Function)

Figure 17:
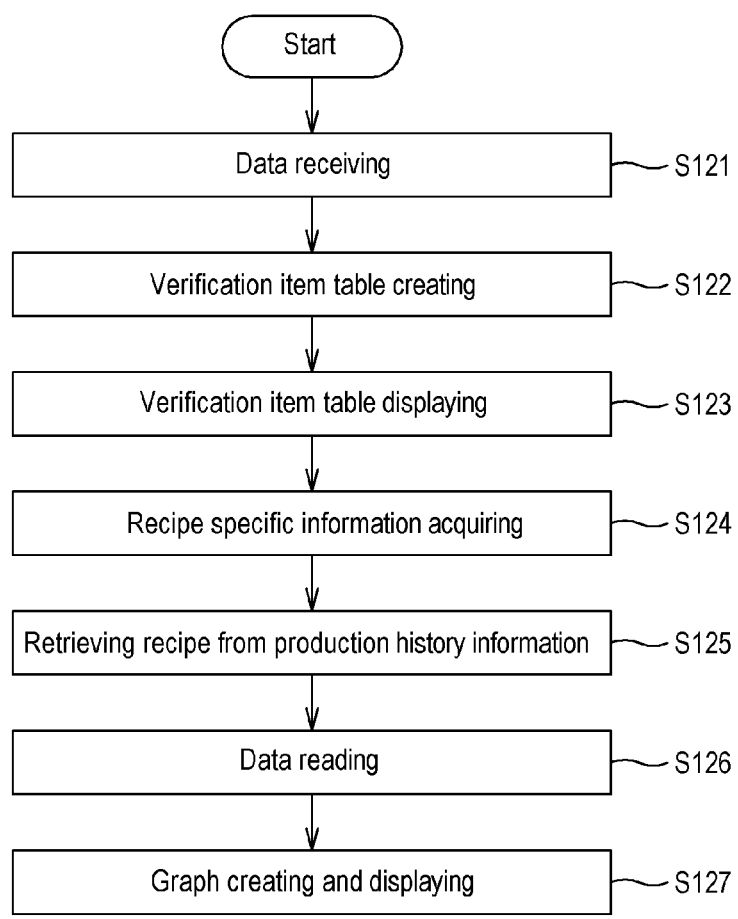
FIG. 17 is a flow chart of data analysis support control according to one embodiment of the present disclosure.

A processing flow of analysis support function executed by the data analysis control part 215f will be described below with reference to FIG. 17.

(Data Receiving Step S121)

First, the data analysis control part 215f receives device data (failure information data) indicating the progress state of a process recipe or the abnormal state of the apparatus 1 from the operation part 201, the process control part 211 and the transfer control part 212 via the communication part 215g and stores the received device data in the storage part 215h. The received failure information data includes part specific information specifying a part region of the apparatus 1, which is a cause of data generation, recipe specific information specifying a recipe executed by the apparatus 1 at the time of data generation, data timing information specifying a timing at which data is generated, and abnormality specific information specifying abnormality. The device data may be stored in the main control storage part 222 instead of the storage part 215h.

(Verification Item Table Creating Step S122)

Upon receiving basic information including the abnormality specific information, the part specific information and the recipe specific information described above, the data analysis control part 215f refers to a part acquisition table stored in the storage part 215h to acquire part region specific information associated with the part specific information. Next, the data analysis control part 215f refers to an abnormality analysis information table stored in the storage part 215h to extract verification item characteristic information associated with both the abnormality specific information and the part specific information. Then, a verification item table is created.

(Verification Item Table displaying Step S123)

Then, the data analysis control part 215f displays the created verification item table on the operation display part 227.

(Recipe Specific Information Acquiring Step S124)

Next, the data analysis control part 215f receives a selection operation from a maintenance engineer via the operation display part 227 for the verification item characteristic information included in the verification item table. Then, the data analysis control part 215f acquires the recipe specific information from the basic information.

(Retrieving Recipe from Production History Information Step S125)

The data analysis control part 215f refers to production history information to retrieve the recipe specific information included in the basic information. For example, the retrieval is made so as to go back to the past recipe from the latest recipe among a plurality of recipes recorded in the production history information. Upon detecting the recipe specific information included in the basic information from the production history information, the data analysis control part 215f acquires the start time and the end time of the recipe specified by the detected recipe specific information.

(Data Reading Step S126)

The data analysis control part 215f reads from the storage part 215h data, which occurs between the acquired start time and end time and are associated with both of the recipe specific information and the verification item characteristic information, as failure information monitoring result data.

When referring to the production history information, if the recipe specified by the recipe specific information has been executed a plurality of times, the data analysis control part 215f reads the failure information monitoring result data a predetermined number of times (for example, ten times backward from the latest recipe). That is, the data analysis control part 215f repeats the step S126 a predetermined number of times.

(Graph Creating and Displaying Step S127)

Then, based on the data timing information associated with the read failure information monitoring result data, the data analysis control part 215f superimposes and graphs the failure information monitoring result data in time series while aligning the start times of recipes. Then, the data analysis control part 215f displays the created time-serial graph on the operation display part 227.

The data analysis control part 215f according to the present embodiment refers to the abnormality analysis information table to extract the verification item characteristic information associated with both the abnormality specific information and the part region specific information, and displays the extracted verification item characteristic information so as to create and display the verification item table. This allows a maintenance engineer to surely know verification items required to perform the abnormality analysis and to perform the abnormality analysis accurately.

In addition, since only the verification item characteristic information associated with both of the abnormality specific information and the part portion specific information is included in the verification item table, it is possible to prevent the maintenance engineer from carrying out verification items not required to be performed and it is possible to avoid wasteful time unnecessary for abnormality analysis.

The data analysis control part 215f according to the present embodiment receives a selection operation of the verification item characteristic information included in the verification item table, reads data (failure information monitoring result data) associated with both of the recipe specific information and the verification item characteristic information from a database, superimposes and graphs the read failure information monitoring result data in time series based on the data timing information while aligning the start times of recipes, and displays the created time-serial graph on the operation display part 227. This contributes to reduction of analysis time and reduction of analysis errors due to variations in maintenance engineer' skills.

The data analysis control part 215f according to the present embodiment is configured to be able to repeatedly read data a predetermined number of times (for example, ten times backward from the latest recipe) when creating a time-serial graph. Then, based on the data timing information, the data analysis control part 215f creates a time-serial graph by superimposing and graphing the read failure information monitoring result data in time series while aligning the start times of recipes, and displays the time-serial graph on the operation display part 227. This makes it possible to reduce the burden of work on data acquisition by a maintenance engineer who performs abnormality analysis.

Example 1

Next, a process of displaying on the operation display part 227 the integration screen of the operation state of the apparatus 1 shown in FIG. 8 and a process of using the diagnosis method item list shown in FIG. 9 to derive the information evaluating the operation state of the apparatus 1 will be described on the basis of the processing flow of the screen display program shown in FIG. 7.

In Example 1, among the four functions (data matching, parts management, device state monitoring and data analysis support) of the device management controller 215, the device state monitoring result data output from the device state monitoring control part 215e, the maintenance timing monitoring result data output from the parts management control part 215d, and the failure information monitoring result data output from the data analysis control part 215f are used to derive information indicating the operation state of the apparatus 1.

First, the integration screen displaying step S11 shown in FIG. 7 is executed. Thereby, for example, icon files including a Health Check View screen (abnormal part display screen), a Supply Check screen (supply state display screen), a Health Summary screen (health condition summary display screen) and a Detail Information screen (detailed information display screen), which are shown in FIG. 8, are read from the storage part 215h and are collectively displayed on the screen of the operation display part 227.

Next, in the monitoring result data acquiring step S12 shown in FIG. 7, the screen display control part 215b acquires from the storage part 215h the diagnosis result data (monitoring result data) output by the data matching control part 215c, the parts management control part 215d, the device state monitoring control part 215e and the data analysis support control part 215f, as necessary, in accordance with the diagnosis method items of the diagnosis method item list shown in FIG. 9. Hereinafter, even when not specifically described, the monitoring result data output by each control part is stored in the storage part 215h each time it is output.

(Diagnosis Target Item on Detail Information Screen)

First, a device state monitoring target will be described with reference to FIG. 8. In the detailed information display screen, the parts "classification" of the apparatus 1 includes a reaction chamber, a transfer chamber, a loader chamber, a transfer system and a customer utility. In addition, "Module"

in the reaction chamber includes temperature, pressure, gas, exhaust pressure and water. "Module" in the transfer chamber includes $O_2$ (oxygen) concentration, pressure and temperature. "Module" in the loader chamber includes $N_2$ (nitrogen) supply amount and exhaust pressure. "Module" in the substrate transfer system includes a pod opener. "Module" in the customer utility includes gas (GAS), pressure, exhaust pressure, PUMP and water.

These "Modules" are targets to be monitored by control parts such as the parts management control part 215d, the device state monitoring control part 215e, etc., that is, diagnosis target items that are health condition diagnosis targets (evaluation targets for stable operation) of the apparatus. In the example of FIG. 8, a diagnosis target concerning the reaction chamber in the "classification" includes a reaction chamber temperature, a reaction chamber pressure, a flow rate of a gas (a processing gas, a dilution gas or the like) supplied into the reaction chamber, an exhaust pressure for exhausting a gas from the reaction chamber, and a flow rate of cooling water supplied to components of the reaction chamber.

The gas and pressure of the diagnosis target item for the customer utility in the "classification" are a flow rate and a pressure of a gas (a processing gas or a dilution gas) supplied from customer equipment into the apparatus 1, respectively. The exhaust pressure is a pressure at which a gas is exhausted from the customer equipment to the apparatus 1 and the water is a flow rate of cooling water supplied from the customer equipment into the apparatus 1. The customer utility is device data on items supplied from a device user and is also referred to as facility data (utility data).

As shown in FIG. 8, diagnosis target items related to the customer utility are separated from other diagnosis target items and are collectively displayed in one place. Thus, when device abnormality occurs, it is possible to clearly grasp whether the site of occurrence is a site related to the customer utility for which the customer is responsible or a site for which the device maker is responsible.

(Diagnosis Method Item on Detail Information Screen)

Next, a diagnosis method item list serving as a reference for diagnosis of device data by control parts such as the parts management control part 215d and the device state monitoring control part 215e will be described with reference to FIG. 9. The diagnosis method item list includes an item number (No.) column, a diagnosis item column indicating diagnosis method items, a diagnosis method column indicating the contents and types of the diagnosis method, and a score column (indicating score deduction in the example of FIG. 9).

The diagnosis method items (U.FDC and S.FDC) of item Nos. 1 and 2 are items for diagnosing abnormality of the amount of change in device data over time through comparison with an upper limit value and/or lower limit value of standard data and are monitored by the device state monitoring control part 215e. The FDC is a technique for continuously monitoring the characteristic values output from the apparatus 1 and classifying the types of abnormality, that is, diagnosing the cause or site of the abnormality, by statistically processing a result of the continuous monitoring when the abnormality is detected in a monitored value (i.e., device data), that is, when the monitored value deviates by a predetermined value or more from the standard data.

This FDC does not include Parts, which will be described later, that is, diagnosis of parts lifetime (the number of uses or time of use of parts). When an abnormality is detected by the FDC, since the apparatus 1 is operable and does not immediately have an abnormality of the product, an alarm accompanied by a buzzer sound is not issued.

"U.FDC" is a diagnosis method item for checking whether or not the state of the apparatus 1 is a state in which the quality of a product (for example, a substrate on which a film is formed) of the apparatus 1 can be continuously maintained at normal. The U.FDC is a diagnosis method item created and used by a user of the apparatus 1 and is known as a diagnosis method using a general SPC (Statistical Process Control: Statistical Method). The U.FDC is a diagnosis method item that directly affects the quality of the product, and is used to check, for example, the temperature and pressure of the reaction chamber.

In the U.FDC, it is diagnosed whether or not the temperature of the reaction chamber is between a preset upper limit value and a preset lower limit value. In the example of FIG. 9, the U.FDC is diagnosed using SPC rule 1 (exceeding over 30. Since the U.FDC is narrowed down to SPC items (e.g., the temperature and pressure of the reaction chamber, the oxygen concentration in the substrate transfer chamber, etc.) that are required at minimum for the semiconductor manufacturing field, the user can easily use the U.FDC only with a simple setting such as specifying recipe/step/item (temperature, etc.).

"S.FDC" is a diagnosis method item for checking whether or not the state of constituents of the apparatus 1 (for example, an opening/closing valve, a heater, an MFC, etc.) is within the normal range, and is a diagnosis method item created by the maker of the apparatus 1. The S.FDC is, for example, a diagnosis method related to the zero point correction of an MFC, and diagnoses whether or not a flow rate voltage of the MFC at a zero flow rate is between a preset upper limit value and a preset lower limit value. The S.FDC is a diagnosis method item dedicated to the apparatus, which is standardly installed in the device management controller 215. Since the S.FDC is dedicated to that apparatus, it is configured with the monitoring contents suitable for that apparatus. Although a user may set and use FDC diagnosis method items by switching validity/invalidity of the items, it is not possible to change the content of diagnosis.

"Parts" of item No. 3 is a diagnosis method item created and used by the maker of the apparatus 1 and is used to diagnose a parts maintenance timing by comparing parts data (such as the number of uses and time of use of parts, etc.) related to the lifetime of parts of the apparatus 1 with a value recommended by a parts maker. For example, a timing at which the number of uses of parts reaches the value recommended by the parts maker is diagnosed as a maintenance timing. In addition, based on the actual use history, a timing at which the number of uses of parts reaches 90% or 120% of the recommended value of the parts maker may be diagnosed as a maintenance timing. In this manner, the maintenance timing is determined based on the recommended value of the parts maker.

"Parts" are monitored by the parts management control part 215d. Upon determining that the number of uses has reached the parts maintenance timing, the parts management control part 215d determines that it is abnormal, and stores a result of the determination as maintenance timing monitoring result data in the storage part 215h. However, even when the parts management control part 215d detects an abnormality by the parts, since this does not immediately result in an abnormality of the product, an alarm accompanied by a buzzer sound is not issued.

The target of Parts is mainly parts of a drive system such as an air valve, an air cylinder, a motor driver, etc. For example, while counting the number of uses of parts of the drive system, it is determined whether or not the counted number of uses reaches a maker recommended value (threshold value). "Parts" as diagnosis method items are incorporated in the device management controller 215 at the time of installation of the apparatus 1 and are automatically managed without user' awareness.

"Alarm" of item No. 4 is a diagnosis method item for diagnosing the state of the apparatus 1 based on the number of occurrences of abnormality information (failure information) that may make the apparatus 1 inoperable. In addition, the item Alarm is configured so as not to overlap with items of U.FDC, S.FDC and Parts of item Nos. 1 to 3 (that is, related to abnormality other than those of U.FDC, S.FDC and Parts of item Nos. 1 to 3). In addition, the item Alarm is configured to determine only specific failure and exclude duplication of failure information due to the same cause.

An alarm is issued in company with a buzzer sound. For example, when a substrate is not mounted on a predetermined position of the boat 26 at the time of substrate transfer, an alarm is issued when a sensor detects an abnormality. In addition, for example, when the reaction chamber temperature does not rise to a predetermined temperature at the start of substrate processing, an alarm is issued when a sensor detects an abnormality. Further, for example, when a door of the transfer chamber 23 is not closed, an alarm is issued when a sensor detects an abnormality.

The alarm is monitored by a controller (the operation part 201, the transfer control part 211, the process control part 212, etc.) of the apparatus 1 other than the device management controller 215. When an abnormality is detected, a buzzer is sounded to notify failure information data to the data analysis control part 215*f*. Based on the received failure information data, the data analysis control part 215*f* divides the failure information data generated in the apparatus 1 by a category (Classification or Module) of the target portion, as shown in the detailed information display screen shown in FIG. 8, and monitors the trend of occurrence by category.

This function is incorporated in the device management controller 215 at the time of installation of the apparatus 1 and is automatically managed without user' awareness. In this manner, the data analysis control part 215*f* functions as an alarm monitoring control part that monitors the situation of generation of failure information data of the apparatus 1.

In addition, the monitoring of the failure information data by the alarm may be performed by a control part other than the data analysis control part 215*f*.

(Diagnosis of Diagnosis Target Item on Supply Check Screen)

Before starting the substrate processing of the apparatus 1, the data matching control part 215*c* diagnoses a diagnosis target item displayed on the supply state display screen. As used herein, the phase "before starting the substrate processing" includes a time before a substrate is loaded into the apparatus, such as at a time of startup after the delivery of the apparatus, and a timing when a substrate is transferred.

On the supply state display screen shown in FIG. 8 are displayed six diagnosis target items including a precursor gas (indicated as Precursor in FIG. 8), cooling water (indicated as Cooling Water Flow in FIG. 8), the supply amount of $N_2$ gas into the reaction chamber (indicated as LTP Purge & Blower in FIG. 8), the exhaust amount (indicated as Exhaust in FIG. 8), the exhaust amount of a vacuum pump (indicated as Pump in FIG. 8), and a flow rate of $N_2$ gas into the transfer chamber (indicated as FAN in FIG. 8). These six items are facility data, and some of them overlap "Module" of the customer utility on the detailed information display screen, that is, the diagnosis target item.

The data matching control part 215*c* sets a reference value shown in an initial value table for checking the customer utility or an actual measured value of the master apparatus 1(0), as reference data. For example, before the process of the apparatus 1 is started, facility data corresponding to the diagnosis target items shown in FIG. 8 are compared with the reference data, respectively. The actual measured values of the respective items are compared with the reference data (the reference value shown in the initial value table for checking the customer utility or the actual measured value of the master apparatus 1(0)) and the data matching control part 215*c* determines whether there is an abnormality, based on a degree of deviation from the actual measurement value.

The screen display control part 215*b* is configured to acquire from the storage part 215*h* diagnosis result data related to U.FDC, S.FDC, Parts and Alarm for each diagnosis target item. For example, in a case of the reaction chamber temperature, diagnosis result data (U.FDC, S.FDC, Parts and Alarm) about device data related to temperature such as a set value (set temperature) and the present value of each of the zones (for example, a U (upper) zone, a CU (central upper) zone, a CL (central lower) zone and an L (lower) zone) in a vertical reaction chambers are acquired.

Here, the diagnosis result data on U.FDC and S.FDC are device state monitoring result data, the diagnosis result data on Parts (parts management) are maintenance timing monitoring result data, and the diagnosis result data on Alarm (failure information management) are failure information monitoring result data.

In addition, diagnosis result data used for the supply state display screen are acquired. As described above, these diagnosis result data are result data obtained by comparing the facility data on the utility from the customer with the reference data and are data on diagnosis target items such as gas (GAS), pressure, exhaust pressure, PUMP, water, Precursor, Cooling Water Flow, LTP Purge & Blower, Exhaust, Pump and FAN. The diagnosis result data of the facility data on the utility from the customer are utility monitoring result data.

Next, the data determining step S13 is executed to determine and score the diagnosis result data acquired in S12. In the data determining step S13, with respect to the diagnosis target item, it is determined whether the diagnosis result data is normal or abnormal and what extent the abnormality is.

(Determination on Diagnosis Target Item on Detail Information Screen)

In determination of the diagnosis target item on the detailed information display screen, determination and scoring of diagnosis result data (the diagnosis result data on U.FDC, S.FDC, Parts and Alarm) are performed for each diagnostic target item.

For example, when a diagnosis target item is the reaction chamber temperature, the screen display control part 215*b* determines and scores the diagnosis result data for the reaction chamber temperature according to the score reduction in the score column in FIG. 9, by using the diagnosis result data received from the device state monitoring control part 215*e* and stored in the storage part 215*h*.

Specifically, in the diagnosis method item list shown in FIG. 9, the screen display control part 215*b* determines that the abnormality is large (X) when two or more abnormality data are found, and subtracts a score defined in "X" of the score column of FIG. 9 from the full score (100 points). When there is one abnormality data (diagnosis result data determined as abnormal), it is determined that the abnormality is small (A), and a score defined in a "A" column of FIG. 9 is subtracted from the full point. When there is no abnormality data, it is determined as normal (0), i.e., as the full point.

Further, when there is no diagnosis result data to be determined, e.g., when it is not a diagnosis target at all, when diagnosis result data related to the diagnosis target item is not acquired, etc., the screen display control part 215*b* determines that this case is excluded (–) from the data determination target. The determination result and the scoring result are stored in the storage part 215*h*.

In the example of FIG. 8, first, the diagnosis result data related to the reaction chamber temperature item is determined and scored. If there is at least one diagnosis method item indicating an abnormality for the reaction chamber temperature item, it is determined that the reaction chamber temperature data is abnormal. In addition, if there is no abnormality for all diagnosis method items (U.FDC, S.FDC, Parts and Alarm) on the reaction chamber temperature data, it is determined to be normal.

When the determination and scoring for the diagnosis result data related to the reaction chamber temperature item are completed, similarly, determination and scoring of diagnosis result data for the next diagnosis target item (for example, the reaction chamber pressure) are performed. In this manner, the determination and scoring of the diagnosis result data (that is, quantification of health condition) are performed for each of the diagnosis method items related to all the diagnosis target items.

(Scoring on Detail Information Screen and Health Summary Screen)

Now, a scoring process of the detailed information display screen and the health condition summary display screen will be described in detail. In this process, the screen display control part 215*b* performs scoring as shown in the following steps S201 to S205.

(S201)

First, minus scores of U.FDC, S.FDC, Parts and Alarm for the reaction chamber temperature item are calculated and added up. In the example of FIG. 8, since two or more data for S.FDC are abnormal (X), the minus score for S.FDC is 30 points (see FIG. 9).

In addition, since one data for Parts is abnormal (Δ), the minus score for Parts is 10 points. U.FDC and Alarm have no minus score. Therefore, for the reaction chamber temperature item, the sum of the minus scores is 40 points and the total score (Score) is 60 (=100−40) points.

(S202)

This determination and calculation is performed for all diagnosis target items, that is, all Modules (from reaction chamber temperature to water of customer utility shown in FIG. 8) on the Detail Information screen to acquire scores for all diagnosis target items and store them in the storage part 215*h*.

(S203)

Next, the sum of minus scores of each of the diagnosis method items (U.FDC, S.FDC, Parts and Alarm) totaling all the diagnosis target items is calculated and stored in the storage part 215*h*.

For example, for U.FDC, the sum of minus scores of all diagnosis target items (reaction room temperature to water for customer utility) is calculated. In the example of FIG. 8, since one data for the reaction chamber exhaust pressure item is abnormal (Δ) and one data for the exhaust pressure item of customer utility is abnormal (Δ), the sum of minus scores of U.FDC is 30 points.

Similarly, the sum of minus scores of S.FDC, the sum of minus scores of Parts and the sum of minus scores of Alarm are calculated. In the example of FIG. 8, the minus score of S.FDC is 30 points, the minus score of Parts is 20 points, and the minus score of Alarm is 5 points.

(S204)

Next, for the minus score for each of the diagnosis method items (U.FDC, S.FDC, Parts and Alarm), the present value of the day, the average value of the day, the average value of the recent one week and the average value of the recent one month are calculated and stored in the storage part 215*h*. The average value of the recent one week is the average value of the average values (or highest values) of one day over one week and the average value of the recent one month is the average value of the average values (or highest values) of one day over one month.

(S205)

Next, for the minus score for each of the diagnosis method items (U.FDC, S.FDC, Parts and Alarm), by calculating a totaling value of the present values of the days and subtracting the total value from the full score (100 points), a health index of the apparatus 1 (an evaluation index of the overall operation state of the apparatus) is calculated. In the example of FIG. 8, the health index of 95 points is displayed on the health condition summary display screen. It should be noted that this 95 points is only an example and is not consistent with the score on the detailed information display screen.

In Example 1, "Δ" and "X" are classified by the number of abnormal data. However, the present disclosure is not limited to thereto. For example, if there are one or more abnormalities, it may be classified as "X". If there are one or more warnings indicating that it is getting close to the abnormality state, it may be set to "Δ".

In the above description, in S203, the sum of minus scores of each of the diagnosis method items (U.FDC, S.FDC, Parts and Alarm) is calculated and stored in the storage part 215*h*. However, the sum of scores (100 points−minus score) of each diagnosis method item may be calculated and stored in the storage part 215*h*.

Further, in the above description, in S204, for the minus scores for each of the diagnosis method items (U.FDC, S.FDC, Parts and Alarm), the present value of the day, the average value of the day, the average value of the recent one week and the average value of the recent one month are calculated and stored in the storage part 215*h*. However, for scores (100 points −minus scores) of each of the diagnosis method items, the present value of the day, the average value of the day, the average value of the recent one week and the average value of the recent one month may be calculated and stored in the storage part 215*h*.

(Determination on Diagnosis Target Item on Supply Check Screen)

In the data determining step S13, the diagnosis result data to be used for the supply state display screen is determined. In other words, it is determined whether or not the actual measured value of each diagnosis target item at the beginning of substrate processing exceeds a reference value shown in the initial value table, a value of the master apparatus and a predetermined threshold value (for example, ±3%).

In the example of FIG. 8, for Cooling Water Flow, it is determined that there are two events (indicated by A) in which a value at the start of the process of the apparatus 1 exceeds ±3% from the reference value shown in the initial value table. In addition, for LTP Purge & Blower, it is determined that there is one event (indicated by B) in which a value at the start of the process of the apparatus 1 exceeds ±3% from a value of the master apparatus. In addition, for Exhaust, it is determined that there is one event (indicated by A) in which the value at the start of the process of the apparatus 1 exceeds ±3% from the reference value shown in the initial value table.

(Determination Result Displaying Step S14)

Next, in the determination result displaying step S14, the screen display control part 215b reads the determination result and scoring result in the data determining step S13 from the storage part 215h and updates and displays the detailed information display screen, the abnormality part display screen, the health condition summary display screen and the supply state display screen shown in FIG. 8.

(Update of Detail Information Screen)

In updating the detailed information display screen, for diagnosis result data of each of the diagnosis method item columns (U.FDC, S.FDC, Parts and Alarm) for the respective diagnosis target items, "O" when all the diagnosis result data are determined as normal, "X" when two or more diagnosis result data are determined as abnormal, "Δ" when one or more diagnosis result data is determined as abnormal, and "–" when it is determined that there is no diagnosis result data, are respectively marked in the diagnosis method item columns (U.FDC, S.FDC, Parts and Alarm) on the Detail Information screen. In addition, a score related to each diagnosis target item is marked in the Score column on the detailed information display screen.

In more detail, "O" is marked when the diagnosis result data for U.FDC and S.FDC are determined as normal (no abnormal data), "Δ" is marked when one device state monitoring data is determined as abnormal (abnormal data present), and "X" is marked when two or more device state monitoring data are determined as abnormal (abnormal data present). Thus, it is possible to easily grasp the abnormality state for U.FDC and S.FDC.

In addition, "O" is marked when the diagnosis result data for Parts is determined as no abnormal state (threshold exceeding), "Δ" is marked when one parts data is determined as an abnormal state (threshold exceeding), and "X" is marked when two or more parts data are determined as an abnormal state (threshold exceeding). Thus, it is possible to easily grasp the abnormality state for parts lifetime.

In addition, regarding the diagnosis result data for Alarm, "O" is marked when there is no failure information data, "Δ" is marked when there is one failure information data, and "X" is marked when there are two or more failure information data. When the failure information data have the same identifier (ID), it is diagnosed that one failure has occurred regardless of the number of occurrence of an alarm. Thus, it is possible to easily grasp the abnormality for the failure information generation state.

In addition, on the detailed information display screen, "X" is marked in red and "A" is marked in yellow. Also for the Score column, if a score is less than 100 points and is equal to or more than 80 points, the score is colored in red. If a score is less than 80 points, the score is colored in red.

When a cell in which "X" or "Δ" is marked is clicked on the detailed information display screen, the screen display control part 215b displays detailed information of the diagnosis target item. Thus, for example, when the diagnosis target item is the reaction chamber temperature, it is possible to recognize which portion of the reaction chamber (upper stage, middle stage, lower stage, etc.) has a temperature causing an abnormality.

(Update of Health Check View Screen)

Further, the screen display control part 215b may be configured to display the entire drawing of the apparatus 1, mark or color so that a unit (indicated as a Classification in FIG. 8) and an item (indicated as Module in FIG. 8) including the diagnosis result data determined as abnormal, that is, parts of the apparatus 1 determined as abnormal, can be discriminated as abnormal, and update and display the abnormal part display screen. In the example of FIG. 8, in the entire perspective view of the apparatus 1, a reaction chamber unit (denoted by A in the figure) is colored and displayed in red. The abnormality discrimination indication is appropriately displayed, for example, when there are two or more abnormalities in each of the diagnosis method items such as FDC, Parts, Alarm, etc., or when the score of the Score column is equal to or less than a predetermined score.

(Update of Health Summary Screen)

In addition, the screen display control part 215b is configured to display a change in health condition on the day, the past one week, or the past one month for U.FDC, S.FDC, Parts and Alarm on the health condition summary display screen. In the example of FIG. 8, the screen display control part 215b calculates, a score of the day, an average value of scores of the recent one week, and an average value of scores of the recent one month for each of the diagnosis method items (U.FDC, S.FDC, Parts and Alarm), as described above, and displays a result of the calculation with a bar graph on the health condition summary display screen. The vertical axis of the bar graph represents a relative value for comparison. 0 to 4 on the vertical axis correspond to 0 to 100 of the score.

This health condition is obtained by subtracting a minus score of the day, the past one week or the past one month for U.FDC, S.FDC, Parts and Alarm from the full score (100 points). Thus, with regard to each of the diagnosis method items (U.FDC, S.FDC, Parts and Alarm), the operator can easily grasp the health condition of the apparatus in the day, the health condition of the apparatus in the recent one week and the health condition of the apparatus in the recent one month.

In addition, the number of cases and the minus scores in the day, the past one week or the past one month for U.FDC, S.FDC, Parts and Alarm may be displayed with a bar graph on the health condition summary display screen. Thus, it is possible to easily grasp a change in abnormality for U.FDC, S.FDC, Parts and Alarm.

In addition, the screen display control part 215b is configured to update a health index indicating the health condition of the apparatus on the health condition summary display screen and displays the updated health index numerically on the health condition summary display screen. In the example of FIG. 8, "95 points" is marked on the upper right portion of the health condition summary display screen. This health index is the total score obtained by integrating the diagnosis method items (U.FDC, S.FDC, Parts, Alarm and Score) as described above in S205.

Thus, the operator can easily grasp the apparatus health condition of the very day at a glance. The health index may be displayed in the form of a bar graph or the like that includes the past several weeks or several days instead of numbers. By doing this, for example, the changes of the apparatus health condition in the recent one week can be easily grasped. In addition, when this health index is equal to or less than a predetermined threshold value, a buzzer of the apparatus 1 may be sounded to issue an alarm in order to check the health condition of the apparatus 1.

(Update of Supply Check Screen)

Further, based on the diagnosis result data of the facility data for the diagnosis target items (Precursor, Cooling Water Flow, LTP Purge & Blower, Exhaust, Pump and FAN) acquired in the diagnosis result data acquiring step S12, the screen display control part 215b updates and displays the supply state display screen. At this time, the screen display control part 215b displays as many icons indicating the occurrence of abnormality as the number of diagnosis result data diagnosed as abnormal in the facility data.

For example, if the actual measured value of the above-described diagnosis target item differs by more than ±3% from the reference value shown in the initial value table, an icon A indicating this fact is displayed in association with the corresponding item on the supply state display screen. If the actual measured value of each diagnosis target item differs by more than ±3% from the value of the master apparatus, an icon B indicating this fact is displayed in association with the corresponding item on the supply state display screen. For example, the icon A and the icon B are graphic representations of exclamation marks which are displayed with different colors so as to be distinguished from each other. In the example of FIG. 8, the icons A and B are denoted by A and B, respectively.

In this manner, in the determination result displaying step S14, based on the data acquired in the diagnosis result data acquiring step S12 and the determination result and scoring result of the data determining step S13, the screen display control part 215b processes and displays each screen file acquired in the integration screen displaying step S11.

In Example 1, the screen display control part 215b is configured to display the integration screen shown in FIG. 8, but the illustrated example of FIG. 8 is merely for illustrating one example for explaining the present disclosure.

For example, six items are defined as facility data on the supply state display screen, but the present disclosure is not limited thereto. Similarly, the detailed information display screen, the abnormal part display screen and the health condition summary display screen are not limited to this embodiment. For example, on the detailed information display screen, a unit (indicated as Classification in FIG. 8) and an item (indicated as Module in FIG. 8) are arbitrarily set. Further, in a case where the customer utility is excluded from the health diagnosis of the apparatus 1, it is also possible to exclude the customer utility classification from the detailed information display screen.

In the example of FIG. 8, a total of four screens including the abnormal part display screen, the supply state display screen, the health condition summary display screen and the detailed information display screen are displayed, but one or any more of the four screens may be displayed.

The screen display processing of the screen display control part 215b in Example 1 may have one or more of the following effects:

According to Example 1, since the screen display control part 215b is configured to display the score, the minus score, or the number of abnormal cases for each of the diagnosis method items (U.FDC, S.FDC, Parts and Alarm) on the health condition summary display screen, it is possible to easily grasp the apparatus health condition of the very day, the apparatus health condition of the recent one week, and the apparatus health condition of the recent one month for each diagnosis method item.

According to Example 1, since the screen display control part 215b is configured to display, on the detailed information display screen, the diagnosis result of the diagnosis method item (FDC) for performing the abnormality diagnosis based on the device data for each of the plurality of diagnosis target items, the diagnosis result of the diagnosis method item (Parts) related to the time of use of parts or the number of uses of parts constituting the apparatus, and the diagnosis result of the diagnosis method item (Alarm) related to the number of occurrences of an alarm (failure information) of the apparatus 1, it is easy to grasp a diagnosis result of each diagnosis method item for each diagnosis target item.

Furthermore, since the screen display control part 215b is configured to display a score indicating the health level (degree of normality) for each diagnosis target item, it is easy to grasp the health level for each diagnosis target item.

Example 2

Next, a process of displaying the integration screen of the operation state of the apparatus 1 shown in FIG. 18 on the operation display part 227 and a process of using the diagnosis target item shown in FIG. 18 to derive information evaluating the operation state of the apparatus 1 will be described on the basis of the processing flow of the screen display program shown in FIG. 7. Example 2 has the same diagnosis method in FIG. 9 as Example 1. Example 2 will be described below, but description on other portions overlapping with Example 1 will be appropriately omitted.

In Example 2, among the four functions (data matching, parts management, device state monitoring and data analysis support) of the device management controller 215, the device state monitoring result data output from the device state monitoring control part 215e, the maintenance timing monitoring result data output from the parts management control part 215d, and the utility monitoring result data output from the data matching control part 215c are used to derive information indicating the operation state of the apparatus 1.

First, the integration screen displaying step S11 shown in FIG. 7 is executed. Thereby, icon files including a Health Check View screen (abnormal part display screen), a Supply Check screen (supply state display screen), a Health Summary screen (health condition summary display screen), a Total Scoring Table screen (detailed information display screen) and a Parameter Matching screen (file collation comparison display screen) are read from the storage part 215h and are collectively displayed on the screen of the operation display part 227, as shown in FIG. 18.

The Total Scoring Table screen (detailed information display screen) is the same diagnosis target items and diagnosis methods (U.FDC, S.FDC and Parts) as the Detail Information screen (detailed information display screen) of Example 1 except for the screen name. In addition, although only a reaction chamber is shown as Classification in FIG. 18, a scroll (not shown) may be scrolled to display other diagnosis target items on the screen.

In addition, as items, the Supply Check screen (supply state display screen) has the same diagnosis target items to which a category (described as Category in FIG. 18) and a diagnosis result (described as Check Status in FIG. 18) are merely added. In addition, also in this Supply Check screen (supply state display screen), using scroll (not shown) may display other diagnosis target items on the screen.

Further, the Health Summary screen (health condition summary display screen) has only a simplified portion displaying information evaluating the integrated operation state, compared with Example 1 and the Health Check View screen (abnormality part display screen) is the same as that in Example 1.

The parameter matching screen (file collation comparison display screen) displays a result (matching rate) of file matching performed by the data matching control part 215c, which will be described later, as a file to be stored in each controller (control part) of the apparatus 1. It should be noted that the result of this file matching is not related to the quantification of the information indicating the operation state of the apparatus 1. Here, OU denotes the operation part 201, Robo denotes the transfer control part 211, PMC denotes the process control part 212, and SYSTEM denotes the device management controller 215.

Next, in the monitoring result data acquiring step S12 shown in FIG. 7, data acquisition related to a screen file other than the Parameter Matching screen (file collation comparison display screen) is the same as that in Example 1 and therefore, explanation of which will be omitted.

In Example 2, the screen display control part 215b is configured to acquire the result of the file matching by the data matching control part 215c from the storage part 215h as necessary.

(Tool Matching Function)

Next, a tool matching function by the data matching control part 215c will be described with reference to FIGS. 10 to 12.

In Example 2, a repeater apparatus directly communicates with the master apparatus to acquire necessary data from the master apparatus, so that the repeater apparatus itself can realize a tool matching function of matching the repeater apparatus with the master apparatus without resorting to a management device or a HOST computer which is a kind of upper level computer.

Figure 10:
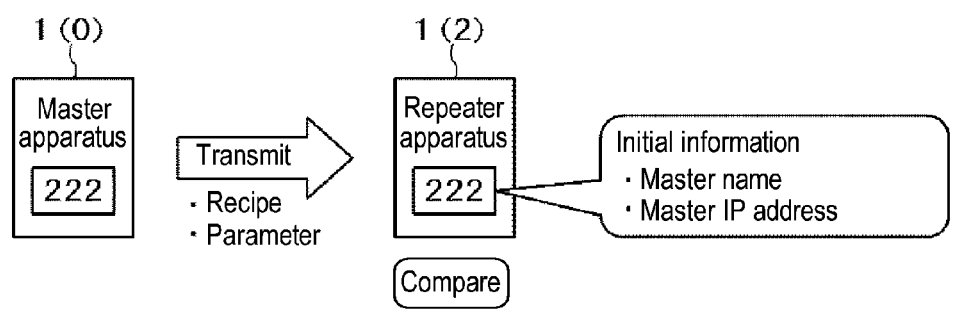
FIG. 10 is a view for explaining a data matching operation according to one embodiment of the present disclosure.

As shown in FIG. 10, the name and IP address (Internet Protocol Address) of the master apparatus 1(0) can be set in the main control storage part 222 of a repeater apparatus, e.g., the repeater apparatus 1(2) as initial information. The name and IP address of this master apparatus 1(0) are set by a worker from, e.g., the operation display part 227 of the repeater apparatus 1(2), but may be delivered from the master apparatus 1(0) to the repeater apparatus 1(2). The reason why two pieces of information such as an IP address and a name are used for connection with the master apparatus 1(0) is that a device name is collated after a communication connection with the master apparatus 1(0) by the IP address is established. This makes it possible to prevent incorrect connection due to an IP address setting miss and allow the worker to perform matching (data matching) without being conscious of the master apparatus.

In the data matching control shown in FIG. 10, the data matching control part 215c of the apparatus 1 including the repeater apparatus 1(2) reads a recipe file or a parameter file from the main control storage part 222 of the master apparatus 1(0), stores it in the main control storage part 222 of the apparatus 1, and performs the file matching.

In the file matching, the recipe file of the master apparatus 1(0) is copied to the apparatus 1 as a recipe file of the apparatus 1, and the parameter file of the master apparatus 1(0) is compared and collated with the parameter file of the apparatus 1.

In addition, the recipe file and the parameter file received from the master apparatus 1(0) may be stored in the storage part 215h of the apparatus 1, instead of the main control storage part 222, to perform the file matching.

The reason for comparing the parameter file rather than copying the parameter file is that a user acquires an optimal parameter while managing the apparatus 1 after delivering the first machine of the apparatus 1 and manages this as know-how. In the absence of such circumstances, the parameter file may be copied in the same manner as in the recipe file, instead of comparing them. Conversely, it is also possible that the recipe files are compared instead of being copied.

While the data matching control (tool matching) is being performed, a progress table of the file matching with the master apparatus 1(0) (copying of the recipe file from the master apparatus 1(0) and comparing the parameter file with the master apparatus 1(0)) is displayed on the operation display part 227, as shown in FIG. 11. This makes it possible to allow a worker to easily know the progress status of the copying of the recipe file and the comparison operation of the parameters and easily restart the operation of copying the recipe file and comparing the parameters.

In the example of FIG. 11, recipe file 1 (Recipe 1) to recipe file 10 (Recipe 10) are copied from the corresponding recipe file of the master apparatus 1(0), and parameter file 1 (Parameter 1) to parameter file 11 (Parameter 11) of the repeater apparatus 1(2) are compared with the corresponding parameter file of the master apparatus 1(0).

For example, with regard to the recipe file 1, the number of files successfully copied out of the total number of files of 200 is 160, and a ratio (matching ratio) at which copying has been successfully performed is 80%. In a "matching ratio" column of the recipe file 1, a ratio at which copying has been successfully performed (a hatching pattern rising to the right in the figure), a ratio at which copying has been unsuccessfully performed (a dotted pattern in the figure), a ratio at which copying could not be performed (a hatching patter rising to the left in the figure), and a ratio at which copying has not yet been completed (a white pattern in the figure) are displayed with a bar graph in order from the left.

These ratios may be displayed to be distinguished from each other on the actual screen, such as blue for the ratio of successful copying, yellow for the ratio of unsuccessful copying, red for the ratio of impossible copying and white for the ratio of incomplete copying.

For example, in a case of a process recipe, impossible copying occurs when there is no combination file in the apparatus 1 as a copying destination. Incomplete copying occurs when a worker interrupts copying. In the case of impossible copying and incomplete copying, the copying can be resumed by removing the cause of impossible copying and incomplete copying and then performing a predetermined operation, for example, clicking on an uncompleted area in the "matching rate" column on the screen of the operation display part 227.

For the other recipe files 2 to 10, the "matching rate" column is displayed with a bar graph in the same manner as the recipe file 1. Then, 85% is displayed in a "File" column as the total matching rate indicating the matching rate of the entire recipe files (the recipe files 1 to 10).

For the parameter file 1, for example, among the total number of files of 244, the number of files in which a comparison result is normal (that is, the file contents are the same) is 231, and a ratio (matching ratio) at which the comparison result is normal is about 95%. In the "matching rate" column of the parameter file 1, a ratio at which the comparison result is normal (a hatching pattern rising to the right in the figure) and a ratio at which the comparison result is abnormal (a hatching pattern rising to the left in the figure) are displayed with a bar graph in order from the left.

For the other parameter files 2 to 11, the "matching ratio" column is displayed with a bar graph in the same manner as the parameter file 1. Then, 92% is displayed in the "Parameter" column as the total matching ratio indicating the matching rate of the entire parameter files (the parameter files 1 to 11).

In addition, as indicated by an arrow attached to a bar graph of the parameter file 9, when the comparison result is abnormal, the differences between the program files can be displayed in detail by clicking an abnormal area of the bar graph on the screen of the operation display part 227.

Figure 12:
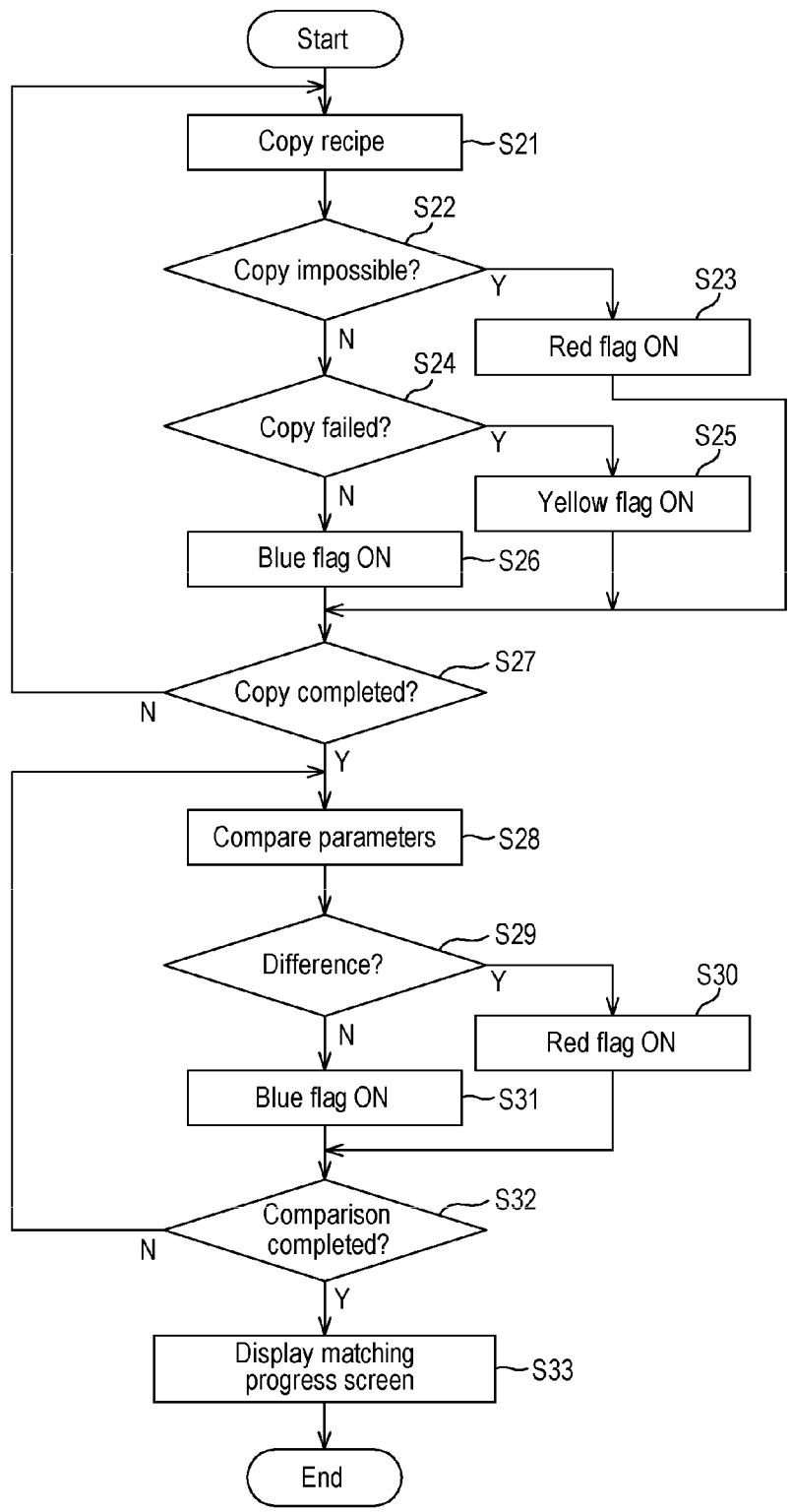
FIG. 12 is a flow chart of file matching according to one embodiment of the present disclosure.

FIG. 12 is a flow chart of a file matching process according to the present embodiment. This file matching process is executed by the data matching control part 215*c*.

First, the first recipe file is copied (step S21 in FIG. 12). If this recipe file cannot be copied (Yes in S22), a red flag is turned on (S23) and the process proceeds to step S27. If the recipe file can be copied (No in S22), it is checked whether or not the copying has failed. If the copying has failed (Yes in S24), a yellow flag is turned on (S25) and the process proceeds to step S27. If the copying has not failed (No in S24), a blue flag is turned on (S26) and the process proceeds to step S27.

In the step S27, it is checked whether or not copying of all the recipe files has been completed. If copying of all the recipe files has not been completed (No in S27), the process returns to S21 to copy the next recipe file.

When copying of all the recipe files has been completed (Yes in S27), comparison of the first parameter file is performed (S28). If there is a difference in the parameter file (Yes in S29), a red flag is turned on (S30) and the process proceeds to step S32. If there is no difference (No in S29), a blue flag is turned on (S31) and the process proceeds to the step S32.

In the step S32, it is checked whether or not the comparison of all the parameter files has been completed. If the comparison of all the parameter files has not been completed (No in S32), the process returns to S28 to perform comparison of the next parameter file.

When the comparison of all the parameter files has been completed (Yes in S32), the matching progress screen shown in FIG. 11 is displayed on the screen of the operation display part 227. At this time, for the files for which the blue flag, the red flag and the yellow flag are turned on, the matching rate columns in FIG. 11 is displayed in blue, red and yellow, respectively. For the incomplete file, the matching rate column in FIG. 11 is displayed in white. Thereafter, the process is ended.

Further, when the matching process of the data matching control part 215*c* is ended (Yes in S32), the data matching control part 215*c* stores in the storage part 215*h* all results of the matching process including the total matching rate.

According to the matching process of the data matching control part 215*c* in the present embodiment, since the data matching control part 215*c* is configured to perform copying and comparison between a file of the apparatus 1 and a file of the master apparatus, the reliability of the file of the apparatus 1 can be increased.

According to the matching process of the data matching control part 215*c* in the present embodiment, since the data matching control part 215*c* is configured to display impossible copying, failed copying, incomplete copying and the presence or absence of differences, it is easy to grasp impossible copying, failed copying, incomplete copying and the presence or absence of differences.

According to the matching process of the data matching control part 215*c* in the present embodiment, since the data matching control part 215*c* is configured to display details when a portion indicating a difference between displayed files is clicked, it is easy to grasp details of the difference between files.

In the present embodiment, the screen display control part 215*b* is configured to acquire from the storage part 215*h* the total matching ratio for the entire file by the data matching control part 215*c* and display the matching rate (Matching Rate) of the file collation comparison display screen.

Next, the data determining step S13 is executed to determine and score the diagnosis result data acquired in S12. As in Example 1, in the data determining step S13, it is determined whether the diagnosis result data is normal or abnormal for the diagnosis target item and to what extent there is an abnormality.

(Determination on Diagnosis Target Item on Total Scoring Table Screen)

In determination of the diagnosis target item on the detailed information display screen, determination of diagnosis result data (the diagnosis result data on U.FDC, S.FDC and Parts) is performed for each diagnostic target item.

Specifically, when there are five or more abnormal data (diagnosis result data determined as abnormal) in the diagnosis result data for U.FDC and S.FDC, the screen display control part 215*b* determines that the abnormality is large (X). When there are one to four abnormal data, the screen display control part 215*b* determines that the abnormality is small (Δ). When there is no abnormal data, the screen display control part 215*b* determines that the diagnosis result data is normal (O). A score per one abnormal data is one point.

Further, when there is no diagnosis result data to be determined, e.g., when it is not a diagnosis target at all, when diagnosis result data related to the diagnosis target item is not acquired, etc., the screen display control part 215*b* determines that this is excluded(−) from the data determination target. Herein after, "X", "Δ", "O" and "−" are sometimes referred to as an error icon, a warning icon, a normal icon and an exclusion icon, respectively. The results of determination and the results of scoring are stored in the storage part 215*h*. The results of the scoring will be described later.

Further, the screen display control part 215*b* is configured to display the determined result on the detailed information display screen. As shown in the example of FIG. 18, as a result of diagnosis of the device data regarding a boat of the item Module using U.FDC shown in FIG. 9, there is one abnormal data. That is, since 99 (100−1) is displayed on the health condition summary display screen, it is estimated that the number of abnormal data is one.

Next, the screen display control part 215*b* is configured to determine the extent of abnormal data in the diagnosis result data for Parts (parts management). When there are 20 or more abnormal data (diagnosis result data determined as abnormal), the screen display control part 215*b* determines that the abnormality is large (X). When there are one to 19 abnormal data, it is determined that the abnormality is small (Δ). When there is no abnormal data, it is determined that the diagnosis result data is normal (O). In the example of FIG. 18, an exclusion icon (−) is displayed for all items since they are excluded from the data determination target.

A score is one point for one to four abnormal data, a score is two points for five to nine abnormal data, a score is three points for 10 to 14 abnormal data, and a score is four points for 15 to 19 abnormal data. In short, the screen display control part 215*b* determines that the abnormality is small up to 20 abnormal data, and displays the warning icon (Δ) on the detailed information display screen.

The screen display control part 215b displays parts corresponding to the diagnosis result data determined as abnormal and output by the parts management control part 215d and the device state monitoring control part 215e, so that the parts can be distinguishably indicated on the abnormal part display screen.

(Determination on Diagnosis Target Items on Supply Check Screen)

In the data determining step S13, the diagnosis result data (utility monitoring result data) output from the data matching controller 215c is determined. That is, the screen display control part 215b determines whether or not an actual measured value of each diagnosis target item at the time of starting the substrate processing exceeds reference data and a predetermined threshold value (for example, ±3%). In the example of FIG. 18, the diagnosis result data for all items are within the threshold value.

When there is an item whose value at the start of the process of the apparatus 1 is out of the reference data (a reference value indicated in the initial value table), the screen display control part 215b displays an icon (A icon) indicating that an abnormality occurs in the corresponding determination result (Check Status) cell. When the A icon is selected on the screen, information on a more detailed target item is displayed. For example, a plurality of facility data are associated with one item and abnormal data (utility monitoring result data determined as abnormal) among these facility data is displayed so as to be distinguishably indicated such as coloring in red or the like. Incidentally, a score is one point for one colored facility data (abnormal data).

(Scoring on Health Summary Screen)

Next, a scoring process on the health condition summary display screen will be described in detail. A health index as an evaluation index of the overall operation state of the apparatus is expressed by the following equation using a subtraction method, for example.

Health index=full score (100)−(number of utility monitoring result data determined as abnormal+number of device condition monitoring result data determined as abnormal (U.FDC) +number of device state monitoring result data determined as abnormal Number (S.FDC)+Parts subtraction number)

Here, the Parts subtraction number is a number which increases such that the subtraction number is one point for one to four maintenance timing monitoring result data determined as abnormal, two points for 5 to 9 maintenance timing monitoring result data, three points for 10 to 14 maintenance timing monitoring result data, four points for 15 to 19 maintenance timing monitoring result data, five points for 20 to 24 maintenance timing monitoring result data, etc. That is, the number of maintenance timing monitoring result data determined as abnormal is five times as large as the Parts subtraction number.

That is, in FIG. 18, the health index is 99 (=100−(0−1−0−0).

The subtraction number calculated from the number of device state monitoring result data determined as abnormal or the number of utility monitoring result data determined as abnormal can be obtained simply by counting the number of abnormalities. Although there is no need to pay particular attention, care must be taken since the Parts subtraction number must be calculated and totaled for each of the diagnosis target items.

Next, in the determination result displaying step S14, the screen display control part 215b reads the determination result and scoring result of the data determining step S13 from the storage part 215h and updates and displays the detailed information display screen, the abnormal part display screen, the health condition summary display screen and the supply state display screen shown FIG. 18.

(Update of Total Scoring Table Screen)

In updating the detailed information display screen, the screen display control part 215b displays "O" when all diagnosis result data in each of the diagnosis method items (U.FDC and S.FDC) for each diagnosis target item are determined as normal, "X" when 5 or more diagnosis result data are determined as abnormal, "Δ" when one to four diagnosis result data are determined as abnormal, and "–" when there is no diagnosis result data to be determined.

Further, the screen display control part 215b displays "O" and "–" for the diagnosis result data in the diagnosis method item (Parts) column of the detailed information display screen in the same manner as the diagnosis method items (U.FDC and S.FDC), "X" when 20 or more diagnosis result data in the diagnosis method item (Parts) column are determined as abnormal, and "Δ" when one to 19 diagnosis result data in the diagnosis method item (Parts) column are determined as abnormal.

As in Example 1, an Alarm (failure management) column may be additionally displayed, and a score for each diagnosis target item may be displayed in an additional score column. However, in this case, the screen display control part 215b is configured to execute S201 to S205 described in Example 1.

Similarly to Example 1, when a cell in which "X" or "Δ" is marked is clicked on the detailed information display screen, the screen display control part 215b further displays detailed information of the diagnosis target item.

(Update of Health Check View Screen)

Similarly to Example 1, the screen display control part 215b is configured to display the entire drawing of the apparatus 1, mark or color such that a unit (indicated as Classification in FIG. 18) and an item (indicated as Module in FIG. 18) including the diagnosis result data determined as abnormal, that is, a part of the apparatus 1 determined as abnormal, can be distinguished as abnormal.

(Update of Health Summary Screen)

The screen display control part 215b is configured to derive information indicating the operation state of the apparatus 1 by using the device state monitoring result data output from the device state monitoring control part 215e, the maintenance timing monitoring result data outputted by the parts management control part 215d, and the utility monitoring result data output from the data matching control part 215c.

Specifically, the screen display control part 215b is configured to display a health index (index indicating the health condition) of the apparatus 1 by a subtraction method using the device state monitoring result data determined as abnormal and output from the device state monitoring control part 215e, the maintenance timing monitoring result data determined as abnormal and output from the parts management control part 215d, and the utility monitoring result data determined to be abnormal and output from the data matching control part 215c.

(Update of Supply Check Screen)

The screen display control part 215b updates and displays the supply state display screen based on the diagnosis result data of the facility data for a precursor (Precursor in FIG. 8),cooling water (Cooling Water Flow in FIG. 8), purge temperature (LTP Purge & Blower in FIG. 8), exhaust (Exhaust in FIG. 8) and pump (Pump in FIG. 8), which are diagnosis target items acquired in the diagnosis result data acquiring step S12.

(Update of Parameter Matching Screen)

Further, the screen display control part 215b updates and displays the file comparison display screen based on data indicating the total matching ratio among result data of the file matching for PMC, SYSTEM, OU and Robo which are file matching target items acquired in the diagnosis result data acquiring step S12.

In this manner, according to Example 2, since the screen display control part 215b is configured to display the result of comparison of parameter files between the apparatus 1 (repeater apparatus) and the master apparatus before starting the substrate processing, when the matching rate is low, it is possible to take a measure such as not starting the substrate processing until matching of a file with the master apparatus is achieved. Furthermore, for a parameter file related to a recipe file for substrate processing, when the matching rate is low, it is possible to prevent lot-out by prohibiting a recipe from being executed.

According to Example 2, since the screen display control part 215b uses the utility monitoring result data indicating a result of comparison between the facility data provided from a customer factory and the reference data to derive the information indicating the operation state of the apparatus 1, it is possible to evaluate the comprehensive operation state of the apparatus with higher accuracy.

In the present embodiment as described above, the device management controller 215 may be further configured to notify the host controller of information indicating the operation state of the apparatus 1.

In addition, in the present embodiment as described above, for example, a subtraction method (a method of subtracting from the full point) is used to quantitatively calculate information indicating the operation state of the apparatus 1. However, the present disclosure is not limited to this calculation method. For example, points may be added according to the number of abnormalities.

The device management controller 215 in the present embodiment may have one or more of the following effects:

(1) According to the present embodiment, since the information that evaluates the operation state of the apparatus is derived based on a plurality of monitoring result data selected from a group consisting of the maintenance timing monitoring result data acquired by the parts management control part 215d, the device state monitoring result data acquired by the device state monitoring control part 215e, and the utility monitoring result data determined by the data matching control part 215c, the device management controller 215 can manage the comprehensive state of the apparatus in a unified manner and can evaluate the comprehensive operation state of the apparatus with higher accuracy.

(2) Since the screen display control part 215b is configured to display the health index on the health condition summary display screen, it is possible to quantitatively grasp the operation state of the apparatus at a glance.

(3) Since the screen display control part 215b is configured to display parts of the apparatus 1 including the diagnosis result data determined as abnormal on the abnormal part display screen so that the abnormality can be discriminated, it is possible to easily grasp which part is abnormal.

(4) Since the screen display control part 215b is configured to display on the supply state display screen the fact that the measured value of the facility data at the start of the process of the apparatus 1 exceeds a predetermined threshold value with respect to the reference data, it is possible to easily grasp an abnormality of the facility data at the start of the process of the apparatus 1.

(5) In addition, since the screen display control part 215b is configured to display on the supply state display screen the fact that the actual measured value of the facility data is abnormal for each diagnosis target item, it is easy to grasp an abnormality diagnosis target item.

(6) Further, since the screen display control part 215b is configured to display S.FDC which is a diagnosis method created by a maker of the apparatus, in addition to U.FDC which is a diagnosis method created by a user of the apparatus 1, for a diagnosis method item for performing abnormality diagnosis in comparison with the standard data based on a variation in device data over time, it is easy to grasp a diagnosis result of S.FDC for each diagnosis target item.

(7) Further, since the screen display control part 215b is configured to display U.FDC and S.FDC separately, it is easy to grasp a diagnosis result of each of U.FDC and S.FDC.

(8) Since the screen display control part 215b is configured to display on the detailed information display screen a diagnosis result of the diagnosis method item (FDC) for performing the abnormality diagnosis based on the device data for each of a plurality of diagnosis target items and a diagnosis result of the diagnosis method item (Parts) related to the number of uses and the time of use of parts, it is easy to grasp the diagnosis result of each diagnosis method item for each diagnosis target item.

The substrate processing apparatus 1 according to the embodiment of the present disclosure can be applied not only to a semiconductor manufacturing apparatus for manufacturing a semiconductor but also to an apparatus for processing a glass substrate such as an LCD (Liquid Crystal Display) device. Needless to say, the present disclosure can be applied to various substrate processing apparatuses including an exposure apparatus, a lithography apparatus, a coating apparatus, a processing apparatus using plasma and the like.

Further, the film forming process according to the embodiment of the present disclosure may include a film forming process such as CVD (Chemical Vapor Deposition) or PVD (Physical Vapor Deposition), a process of forming an oxide film or a nitride film, a process of forming a film containing metal, and the like.

According to the present disclosure in some embodiments, it is possible to provide information indicating whether or not a substrate processing apparatus can be operated stably.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A substrate processing apparatus comprising at least:
   a device management controller configured to:
      monitor a state of parts constituting the substrate processing apparatus;
      monitor integrity of device data obtained from an operation state of the parts constituting the substrate processing apparatus; and
      monitor facility data provided from a factory facility to the substrate processing apparatus; and
   a storage part that stores a device information and an IP address of a master apparatus,
   wherein the device management controller is configured to:
      make a communication connection with the master apparatus with the IP address and then collate a device information of the master apparatus acquired by the communication connection with the device information of the master apparatus stored in the storage part; and
      acquire a file from the master apparatus when the device information match each other in a collation, and set the acquired file to be a file of the substrate processing apparatus.

2. The substrate processing apparatus of claim 1, further comprising a display device including an operation screen, wherein the device management controller is configured to cause the display device to display a progress status of setting the acquired file to be the file of the substrate processing apparatus.

3. The substrate processing apparatus of claim 1, further comprising a display device including an operation screen, wherein the device management controller is configured to cause the display device to display a ratio of matching between files as a result of file setting between apparatuses.

4. The substrate processing apparatus of claim 1, wherein the device management controller is configured to compare the device data obtained from the operation state of the parts constituting the substrate processing apparatus with standard data corresponding to the device data and determine whether or not the device data is abnormal.

5. The substrate processing apparatus of claim 1, wherein the device management controller is configured to make communication connection with a master apparatus having standard device data and obtain the standard device data from the master apparatus.

6. The substrate processing apparatus of claim 1, wherein the device management controller is configured to compare parts data of the parts constituting the substrate processing apparatus with a threshold value corresponding to the parts data and determine replacement timing according to whether the parts data exceeds the threshold value.

7. The substrate processing apparatus of claim 1, wherein the device management controller is configured to compare the facility data related to a plurality of diagnosis target items for customer utility item, which is an item supplied from the factory facility, with reference data serving as a reference for the facility data, and determine whether or not the facility data is abnormal.

8. The substrate processing apparatus of claim 7, wherein the device management controller is configured to compare the facility data with the reference data and display an icon indicating that an abnormality occurs in accordance with the presence or absence of the facility data determined as abnormal.

9. A substrate processing apparatus comprising at least:
   a device management controller configured to:
      monitor a state of parts constituting the substrate processing apparatus;
      monitor integrity of device data obtained from an operation state of the parts constituting the substrate processing apparatus; and
      monitor facility data provided from a factory facility to the substrate processing apparatus; and
   a storage part that stores a device information and an IP address of a master apparatus,
   wherein the device management controller is configured to:
      make a communication connection with the master apparatus with the IP address and then collate a device information of the master apparatus acquired by the communication connection with the device information of the master apparatus stored in the storage part; and
      acquire a file from the master apparatus when the device information match each other in a collation and collate the acquired file of the master apparatus with a file of the substrate processing apparatus.

10. The substrate processing apparatus of claim 9, further comprising a display device including an operation screen, wherein the display device is configured to display on the operation screen a screen for displaying a result of comparison between a file of the substrate processing apparatus and a file of a master apparatus.

11. The substrate processing apparatus of claim 9, further comprising a display device including an operation screen, wherein the device management controller is configured to cause the display device to display a collation progress status of the file of the master apparatus.

12. The substrate processing apparatus of claim 9, further comprising a display device including an operation screen, wherein the device management controller is configured to cause the display device to display a ratio of matching between files as a result of file collation between apparatuses.

13. The substrate processing apparatus of claim 9, wherein the device management controller is configured to compare the device data obtained from the operation state of the parts constituting the substrate processing apparatus with standard data corresponding to the device data and determine whether or not the device data is abnormal.

14. The substrate processing apparatus of claim 9, wherein the device management controller is configured to make a communication connection with a master apparatus having standard device data and obtain the standard device data from the master apparatus.

15. The substrate processing apparatus of claim 9, wherein the device management controller is configured to compare parts data of the parts constituting the substrate processing apparatus with a threshold value corresponding to the parts data and determine replacement timing according to whether the parts data exceeds the threshold value.

16. The substrate processing apparatus of claim 9, wherein the device management controller is configured to compare the facility data related to a plurality of diagnosis target items for customer utility item, which is an item supplied from the factory facility, with reference data serving as a reference for the facility data, and determine whether or not the facility data is abnormal.

17. The substrate processing apparatus of claim 16, wherein the device management controller is configured to compare the facility data with the reference data and display an icon indicating that an abnormality occurs in accordance with the presence or absence of the facility data determined as abnormal.

18. A device management controller configured to:
monitor a state of parts constituting the substrate processing apparatus;
monitor integrity of device data obtained from an operation state of the parts constituting the substrate processing apparatus;
monitor facility data provided from a factory facility to the substrate processing apparatus;
access a storage part that stores a device information and an IP address of a master apparatus;
make a communication connection with the master apparatus with the IP address and then collate a device information of the master apparatus acquired by the communication connection with the device information of the master apparatus stored in the storage part; and
acquire a file from the master apparatus when the device information match each other in a collation, and collate the acquired file of the master apparatus with a file of the substrate processing apparatus.

19. A non-transitory computer-readable recording medium storing a program that causes a substrate processing apparatus to perform a process, wherein the substrate processing apparatus comprises a device management controller and a storage part that stores a device information and an IP address of a master apparatus, the process comprising:
monitoring a state of parts constituting the substrate processing apparatus;
monitoring integrity of device data obtained from an operation state of the parts constituting the substrate processing apparatus;
monitoring facility data provided from a factory facility to the substrate processing apparatus;
making a communication connection with the master apparatus with the IP address and then collate a device information of the master apparatus acquired by the communication connection with the device information of the master apparatus stored in the storage part; and
acquiring a file from the master apparatus when the device information match each other in a collation, and collating the acquired file of the master apparatus with a file of the substrate processing apparatus.

20. A device management controller configured to:
monitor a state of parts constituting the substrate processing apparatus;
monitor integrity of device data obtained from an operation state of the parts constituting the substrate processing apparatus;
monitor facility data provided from a factory facility to the substrate processing apparatus;
access a storage part that stores a device information and an IP address of a master apparatus; and
make a communication connection with the master apparatus with the IP address and then collate a device information of the master apparatus acquired by the communication connection with the device information of the master apparatus stored in the storage part; and
acquire a file from the master apparatus when the device information match each other in a collation, and set the acquired file to be a file of the substrate processing apparatus.

21. A non-transitory computer-readable recording medium storing a program that causes a substrate processing apparatus to perform a process, wherein the substrate processing apparatus comprises a device management controller and a storage part that stores a device information and an IP address of a master apparatus, the process comprising:
monitoring a state of parts constituting the substrate processing apparatus;
monitoring integrity of device data obtained from an operation state of the parts constituting the substrate processing apparatus;
monitoring facility data provided from a factory facility to the substrate processing apparatus;
making a communication connection with the master apparatus with the IP address and then collate a device information of the master apparatus acquired by the communication connection with the device information of the master apparatus stored in the storage part; and
acquiring a file from the master apparatus when the device information match each other in a collation, and setting the acquired file to be a file of the substrate processing apparatus.

* * * * *